(12) United States Patent
Nishikata et al.

(10) Patent No.: US 6,433,880 B1
(45) Date of Patent: *Aug. 13, 2002

(54) IMAGE FORMATION APPARATUS HAVING IMAGE MEMORY

(75) Inventors: Akinobu Nishikata; Shokyo Koh, both of Mishima; Yoshihito Osari, Shizuoka-ken, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/176,597

(22) Filed: Oct. 22, 1998

(30) Foreign Application Priority Data

Oct. 24, 1997 (JP) .............................. 9-292435
Oct. 20, 1998 (JP) ............................ 10-297461

(51) Int. Cl.⁷ .............................................. G06F 15/00

(52) U.S. Cl. ..................................................... 358/1.13
(58) Field of Search .............................. 358/1.13, 1.14, 358/1.2, 1.6; 345/339

(56) References Cited

U.S. PATENT DOCUMENTS 5,881,337 A * 3/1999 Higashikawa et al. ........ 399/82
6,054,988 A * 4/2000 Alimpich et al. ........... 345/353
6,181,436 B1 * 2/2001 Kurachi ..................... 258/1.15

* cited by examiner

*Primary Examiner*—Jerome Grant, II
(74) *Attorney, Agent, or Firm*—Fitzpatrick, Cella, Harper & Scinto

(57) ABSTRACT

An image formation apparatus which has a memory for storing plural read images is provided. In the apparatus, setting of a second copy job and image reading are possible even if a first copy job is being executed. Further, even if feeder jam or printer jam occurs in the first copy job when the second copy job is being set, such the jam is displayed at appropriate timing, so that operability of the apparatus can be significantly improved.

32 Claims, 34 Drawing Sheets

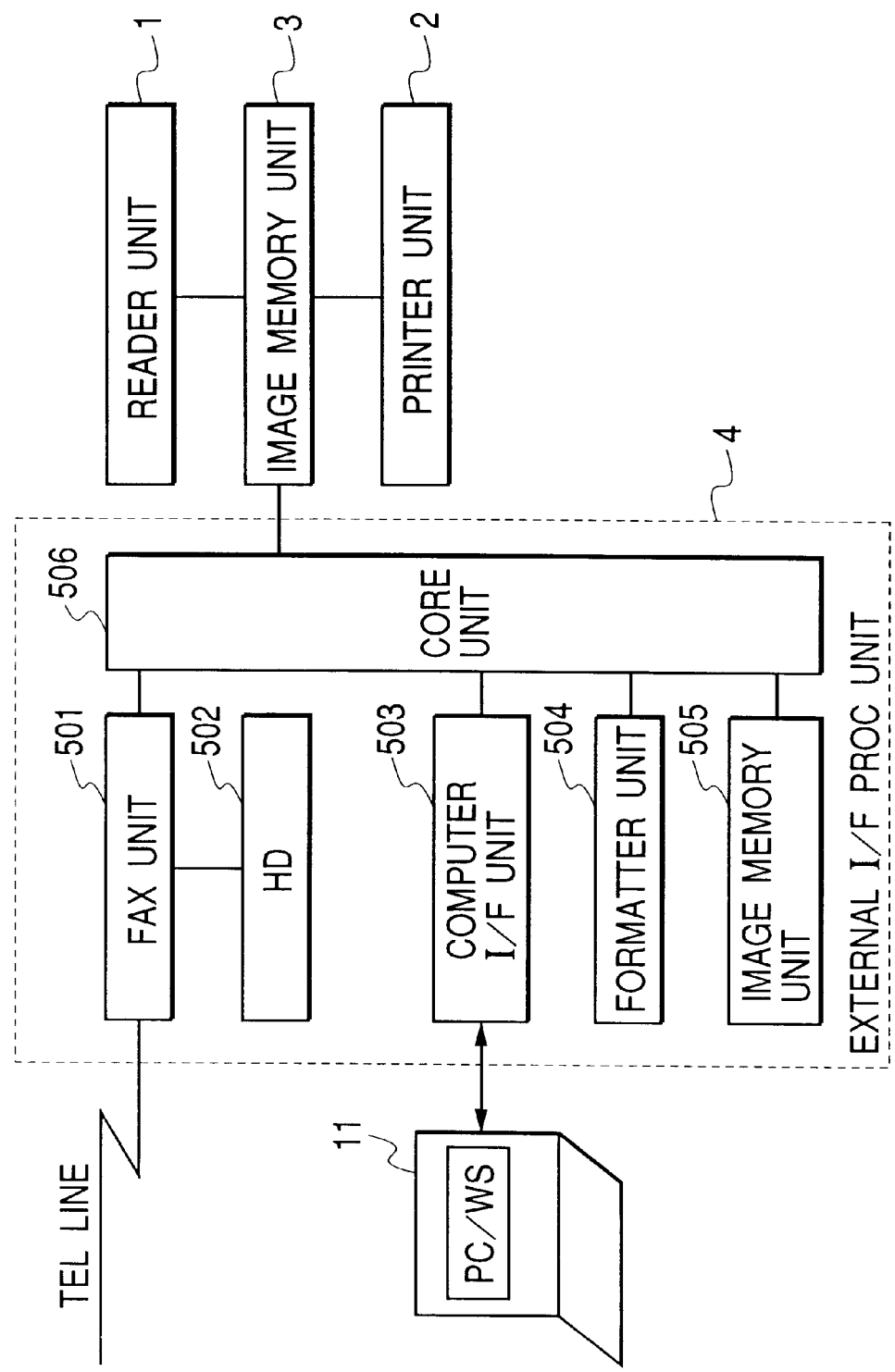

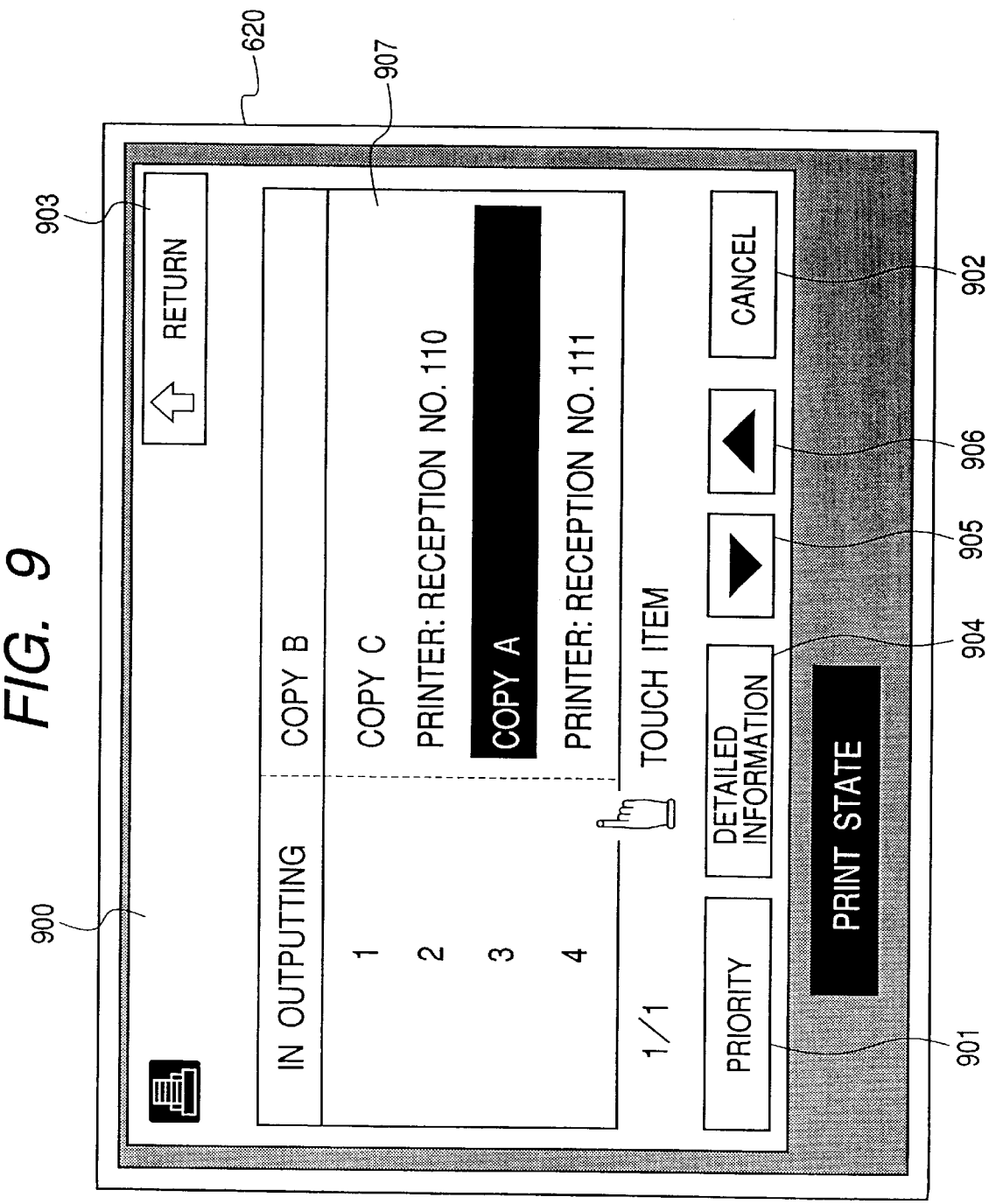

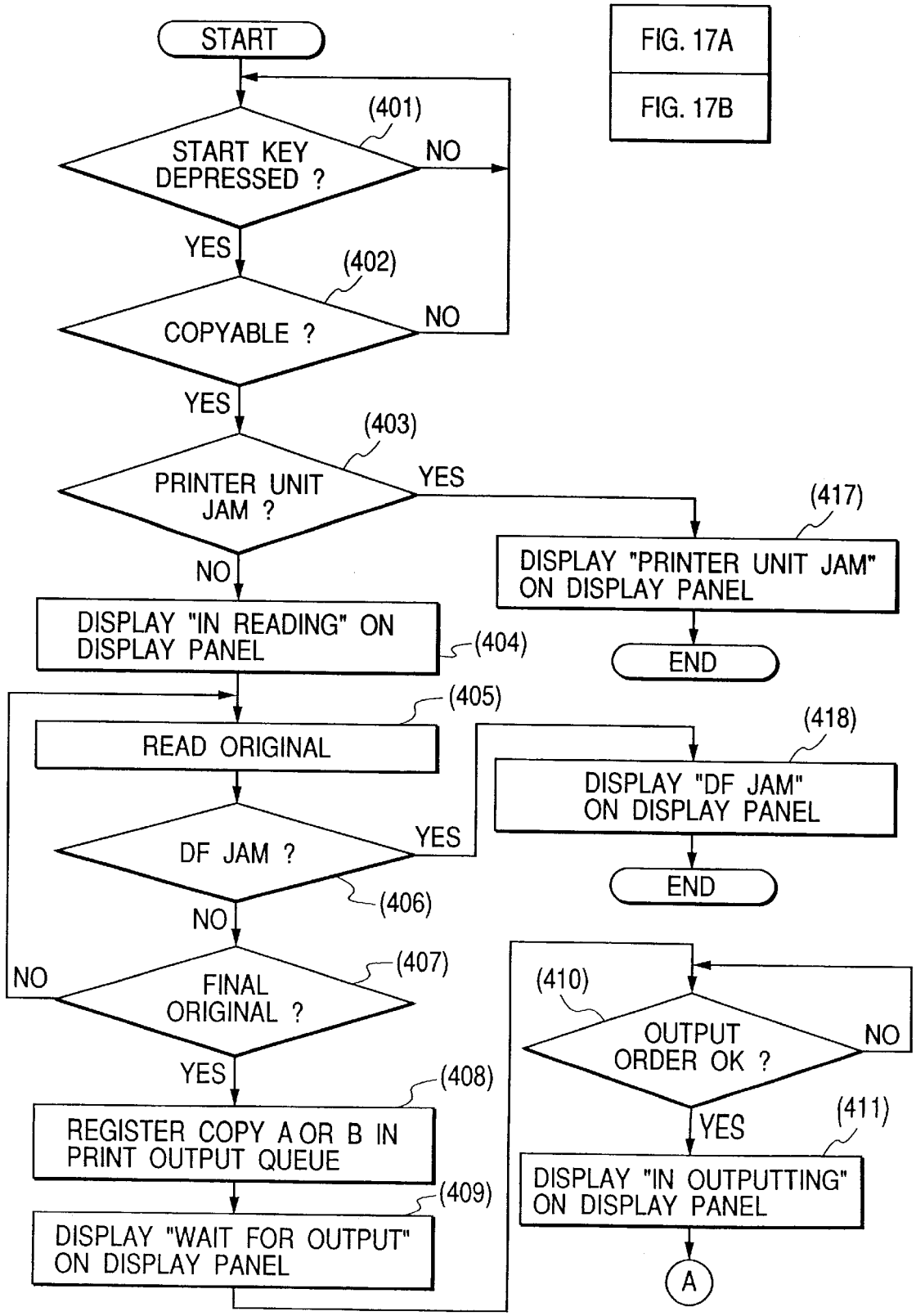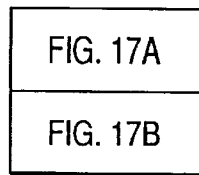

FIG. 27

◇⁄ PAPER JAM AT ● PORTION
REMOVE JAMMED PAPER ACCORDING TO ILLUSTRATED
PROCEDURE (PRINTER JAM)

◇⁄ REMOVE PAPER

FIG. 34

| DIRECTORY INFORMATION |
|---|
| FIRST DATA PROC PROGRAM<br>PROGRAM CODE GROUP CORRESPONDING TO STEPS IN FIG. 10 FLOW CHART |
| SECOND DATA PROC PROGRAM<br>PROGRAM CODE GROUP CORRESPONDING TO STEPS IN FIG. 11 FLOW CHART |
| THIRD DATA PROC PROGRAM<br>PROGRAM CODE GROUP CORRESPONDING TO STEPS IN FIG. 12 FLOW CHART |
| FOURTH DATA PROC PROGRAM<br>PROGRAM CODE GROUP CORRESPONDING TO STEPS IN FIG. 13 FLOW CHART |
| FIFTH DATA PROC PROGRAM<br>PROGRAM CODE GROUP CORRESPONDING TO STEPS IN FIGS. 17A AND 17B FLOW CHARTS |
| SIXTH DATA PROC PROGRAM<br>PROGRAM CODE GROUP CORRESPONDING TO STEPS IN FIG. 18 FLOW CHART |
| SEVENTH DATA PROC PROGRAM<br>PROGRAM CODE GROUP CORRESPONDING TO STEPS IN FIG. 19 FLOW CHART |
| EIGHTH DATA PROC PROGRAM<br>PROGRAM CODE GROUP CORRESPONDING TO STEPS IN FIG. 20 FLOW CHART |
| NINTH DATA PROC PROGRAM<br>PROGRAM CODE GROUP CORRESPONDING TO STEPS IN FIG. 21 FLOW CHART |
| TENTH DATA PROC PROGRAM<br>PROGRAM CODE GROUP CORRESPONDING TO STEPS IN FIG. 22 FLOW CHART |
| |

IMAGE FORMATION APPARATUS HAVING IMAGE MEMORY

BACKGROUND OF THE INVENTION

1. Field of the Invention

The present invention relates to an image formation apparatus which has an image memory, and in which, during execution of one job, a setting operation for the other job can be performed.

2. Related Background Art

Conventionally, in image formation apparatuses such as a digital copy machine and the like each having a memory such as a hard disk or the like to store plural image data, it has been proposed the apparatus having an electronic sorter mode in which original images obta ined throughout a copy job are stored in the memory, data of a first output image in the copy job is read from the memory in due order to form or reproduce the image, and thus an image formation process corresponding to the desired number of copies is performed.

In such the image formation apparatuses as above, when a digital copy machine, an analog copy machine or the like not having the memory such as the hard disk or the like is used, an original image reading process must be repeated plural times corresponding to the number of output copies. On the other hand, when the apparatus having the electronic sorter mode is used, the original image reading process may be performed only once irrespective of the number of output copies. Therefore, the image formation process can be performed without being affected by a factor such as a circulation loss or the like in an automatic original feeder (document feeder: DF) or the like which decreases productivity.

Further, in order to more effectively operate a system of the image formation apparatus which uses the electronic sorter mode, it has been proposed the apparatus in which the original image reading and storing processes are separated from the image formation process, and thus the original image reading and storing processes for a next copy job can be started irrespective of the image formation process after the reading process terminated.

Since the conventional image formation apparatus has been structured as above, in a case where there are two copy jobs intended to be continuously subjected to the image formation process in the image formation apparatus capable of performing in parallel the original reading and storing processes for the next copy job while the image formation process is being performed, there has been a following problem. That is, if a user does not issue any instruction such as start key depression or the like after the original reading process for these two copy jobs terminated, the image formation process can not be started.

Further, in a system which has a display structure capable of displaying setting contents and copy job states (in original reading, in printing, on standby for printing, and the like) for each copy job such that the user can effectively set a copy mode and start a copy operation, when an abnormal state such as paper jam, paper empty or the like occurs, there has been a problem that it is difficult to selectively control whether or not the abnormal state is displayed according to a state of the apparatus.

SUMMARY OF THE INVENTION

An object of the present invention is to provide an image formation apparatus and its control method in which such drawbacks as above have been eliminated.

Another object of the present invention is to provide an image formation apparatus and its control method which can appropriately perform alarm displaying in a case where abnormality in a first job occurs when a setting operation of a second job is being performed during execution of the first job.

Still another object of the present invention is to provide an image formation apparatus and its control method which can appropriately control switching of display screens for a next job in accordance with abnormality in an original feeding system or abnormality in a recording system.

Other objects of the present invention will become apparent from the following detailed description based on the accompanying drawings and the claims.

BRIEF DESCRIPTION OF THE DRAWINGS

FIG. 5 is a block diagram showing a structure of an external interface process unit shown in FIG. 3;

FIG. 9 is a view for explaining an output order display screen on the display panel of FIG. 2 displaying a state of a print output queue;

FIG. 27 is a view showing the copy B setting screen at the time of copy A print jam process and copy B mode setting;

FIG. 34 is a view for explaining a memory map of a storage medium which stores various data process programs readable by the image formation apparatus according to the present invention.

DETAILED DESCRIPTION OF PREFERRED EMBODIMENTS

First Embodiment

Figure 1:
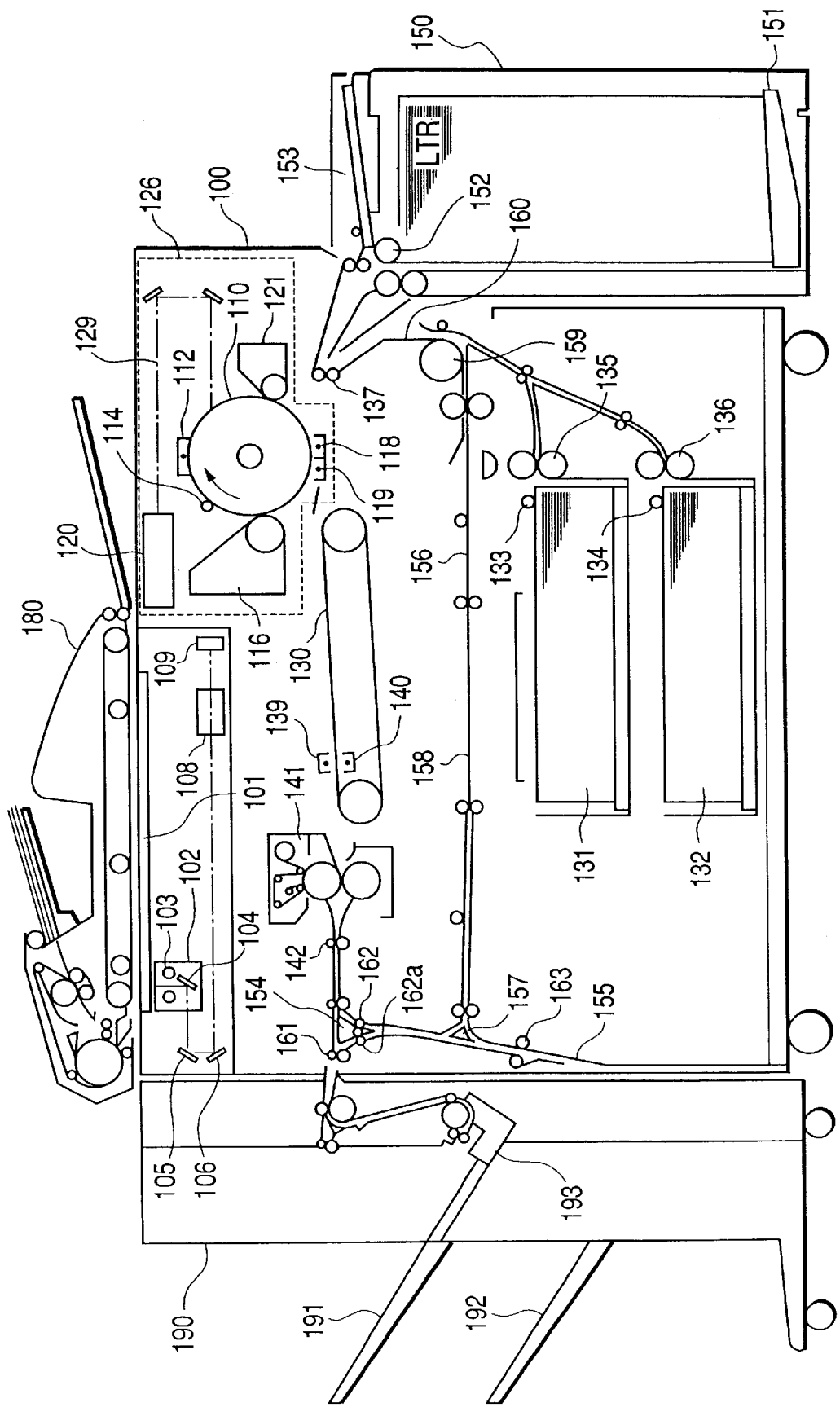
FIG. 1 is a sectional view for explaining a structure of an image formation apparatus according to a first embodiment of the present invention.

FIG. 1 is a sectional view for explaining a structure of an image formation apparatus according to the first embodiment of the present invention, which is composed of an image formation apparatus body 100 and an automatic original feeder (DF) 180.

In the drawing, numeral 100 denotes the image formation apparatus body, and numeral 180 denotes the DF.

In the body 100, numeral 101 denotes a platen glass acting as an original mounting board glass. Numeral 102 denotes a scanner composed of an original illumination lamp 103, a scanning mirror 104 and the like. Light generated from the lamp 103 is reflected by an original mounted on the platen glass 101 and then inputted into an image sensor unit (CCD sensor or the like) 109 through a lens 108 by the scanning mirrors 104 to 106, thereby forming an image corresponding to the original. It should be noted that, since the scanner 102 can be reciprocated along a predetermined direction by a not-shown motor, it can scan the original in whole.

Further, instead of scanning the original by moving the scanning mirror 104 after the original was mounted on the platen glass 101, it is possible to read an original image by fixing the mirror 104 and feeding or moving the original itself with the DF 180.

Numeral 120 denotes an exposure control unit composed of a laser beam generator, a polygon scanner (including rotation polyhedron mirror) and the like (all not shown). The unit 120 generates laser beam 129 modulated based on an image signal converted by the image sensor unit 109 and subjected to a predetermined image process by a later-described image process unit 170, and applies the generated beam 129 to a photosensitive drum 110.

Numeral 126 denotes an image formation unit composed of the photosensitive drum 110, a primary charger 112, a development unit 121, a transfer charger 118, a separation charger 119, a cleaning unit 116, a preexposure lamp 114 and the like. The chargers 112, 118 and 119, the units 121 and 116, and the lamp 114 are arranged around the drum 110.

In the image formation unit 126, the drum 110 is rotated by a not-shown motor in a direction indicated by an arrow, charged at desired potential by the primary charger 112, and then applied with the laser beam 129 from the exposure control unit 120, thereby forming a latent image. The latent image formed on the drum 110 is developed by the development unit 121, and visualized as a toner image.

On the other hand, a transfer paper or sheet fed from an upper cassette 131 by a pickup roller 133 or from a lower cassette 132 by a pickup roller 134 is carried to the body 100 by feed rollers 135 or 136, and fed to the image formation unit 126 by resist rollers 137. Thus, the visualized toner image is transferred onto the transfer paper by the transfer charger 118.

After the image was transferred, a residual toner on the drum 110 is removed by the cleaning unit 116, and also residual charges are removed by the preexposure lamp 114.

Further, the transfer paper after the image transfer is separated from the drum 110 by the separation charger 119, and guided between prefixing chargers 139 and 140 by a transfer belt 130, whereby the toner image is recharged. Then, the toner image is pressed and heated by a fixing unit 141 to fix the toner onto the paper, and the paper is discharged outside the body 100 by discharge rollers 142.

In the body 100, a deck 150 capable of putting, e.g., 4000 sheets of transfer paper is provided. A lifter 151 of the deck 150 goes up according to an amount of the transfer paper such that the paper always contacts with a paper feed roller 152.

It should be noted that, instead of 4000 sheets, the number of sheets loaded on the deck 150 may be 100 or others. Also, a multi-type manual paper feed unit 153 capable of loading 100 sheets of transfer paper is provided.

Numeral 154 denotes a paper discharge flapper used to change or switch a transfer paper feed path among a double-face recording side, a multirecording side and a discharge side. Numeral 158 denotes a lower feed path. The transfer paper fed by the discharge rollers 142 is reversed through a reverse path 155, and then fed to a paper refeed tray 156 through the path 158.

Numeral 157 denotes a multiflapper used to change or switch the path between the double-face recording side and the multirecording side. When the multiflapper 157 is moved leftward, the transfer paper is directly guided to the lower feed path 158 without passing through the reverse path 155.

Numeral 159 denotes a paper feed roller feeding the transfer paper to the image formation unit 126 side through a path 160. Numeral 161 denotes discharge rollers provided in the vicinity of the flapper 154 to outwardly discharge the transfer paper guided to the discharge side by the flapper 154. In case of doubleface recording (i.e., double-face copy) or multirecording (i.e., multicopy), the flapper 154 is raised such that the transfer paper already subjected the copy process is loaded on the paper refeed tray 156 through the paths 155 and 158.

In case of the double-face recording, the multiflapper 157 is moved rightward, while in case of the multirecording, the multiflapper 157 is moved leftward. The transfer paper on the paper refeed tray 156 is fed one by one from the bottom of the stacked sheets, to the resist rollers 137 of the body 100 by the paper feed roller 159 through the path 160.

When the transfer paper is reversed and discharged from the body 100, the paper discharge flapper 154 is moved upward and the multiflapper 157 is moved rightward to feed the copy-processed transfer paper to the reverse path 155 side. After a trailing edge of the transfer paper passed through a first feed roller 162, the flapper 154 is moved rightward to feed the paper to a second feed roller 162a by using reverse rollers 163. Then, the transfer paper is reversed and discharged to a sorter 190 side by the discharge roller 161.

Numeral 190 denotes the paper discharge process unit (i.e., sorter) to align the sheets discharged from the body 100 and bind them into a bundle. That is, in the unit 190, the discharged paper is loaded and aligned on a process tray 193 for each sheet. When the discharging of one image formation process terminates, the bundle of the loaded sheets is stapled and discharged to a discharge tray 191 or 192. The trays 191 and 192 are moved up and down by a not-shown motor such that the desired tray intended to be used for the loading is moved to a process tray position before the image formation operation starts.

Hereinafter, a control structure of the image formation apparatus shown in FIG. 1 will be explained with reference to FIGS. 2 to 5.

Figure 2:
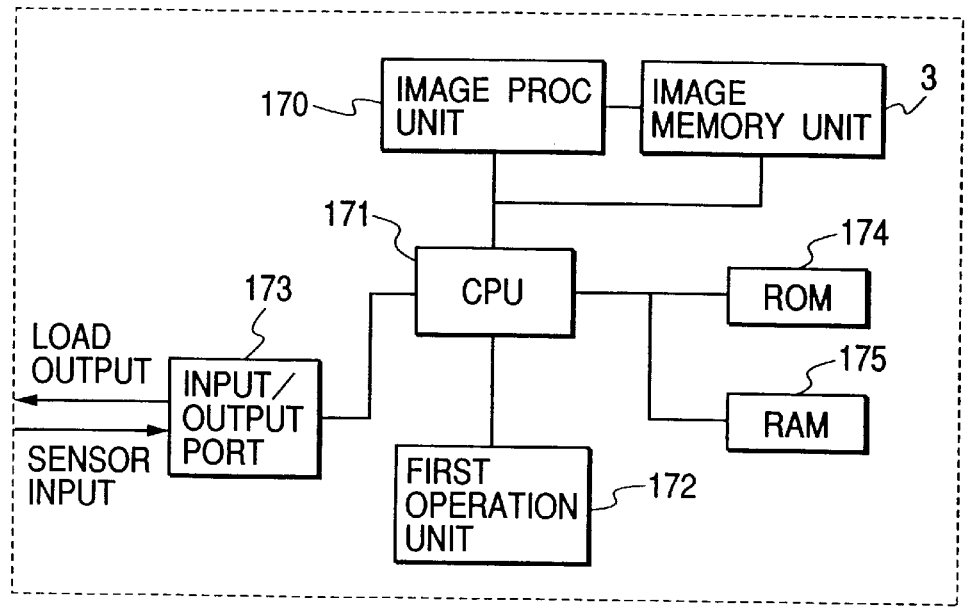
FIG. 2 is a block diagram for explaining a control structure of the image formation apparatus according to the first embodiment of the present invention.

FIG. 2 is the block diagram for explaining the control structure of the image formation apparatus according to the first embodiment of the present invention.

In the drawing, numeral 171 denotes a CPU performing basic controlling of the image formation apparatus body 100. A ROM 174 storing control programs, a RAM 175 acting as a working area for the process, and an input/output port 173 are connected to the CPU 171 through address and data buses. Further, not-shown various loads such as a motor, a clutch and the like for controlling the body 100, and a not-shown sensor or the like for detecting a position of the paper are connected to the port 173. The CPU 171 serially controls data input and output operations through the port 173 on the basis of contents of the control program written in the ROM 174, and performs an image formation operation.

Further, since a first operation unit 172 is connected to the CPU 171, the CPU 171 controls laterdescribed display and key input means (FIG. 6) of the unit 172. An operator instructs the CPU 171 to change or switch an image formation operation mode and a displayed state by key inputting at the unit 172, and the CPU 171 displays a state of the body 100 and key-inputted operation mode setting.

Furthermore, the image process unit 170 processing the electrical signal converted by the image sensor unit 109 (FIG. 1), and an image memory unit 3 storing the processed images are connected to the CPU 171.

Hereinafter, a structure of the image process unit 170 shown in FIG. 2 will be explained along an image data flow.

Figure 3:
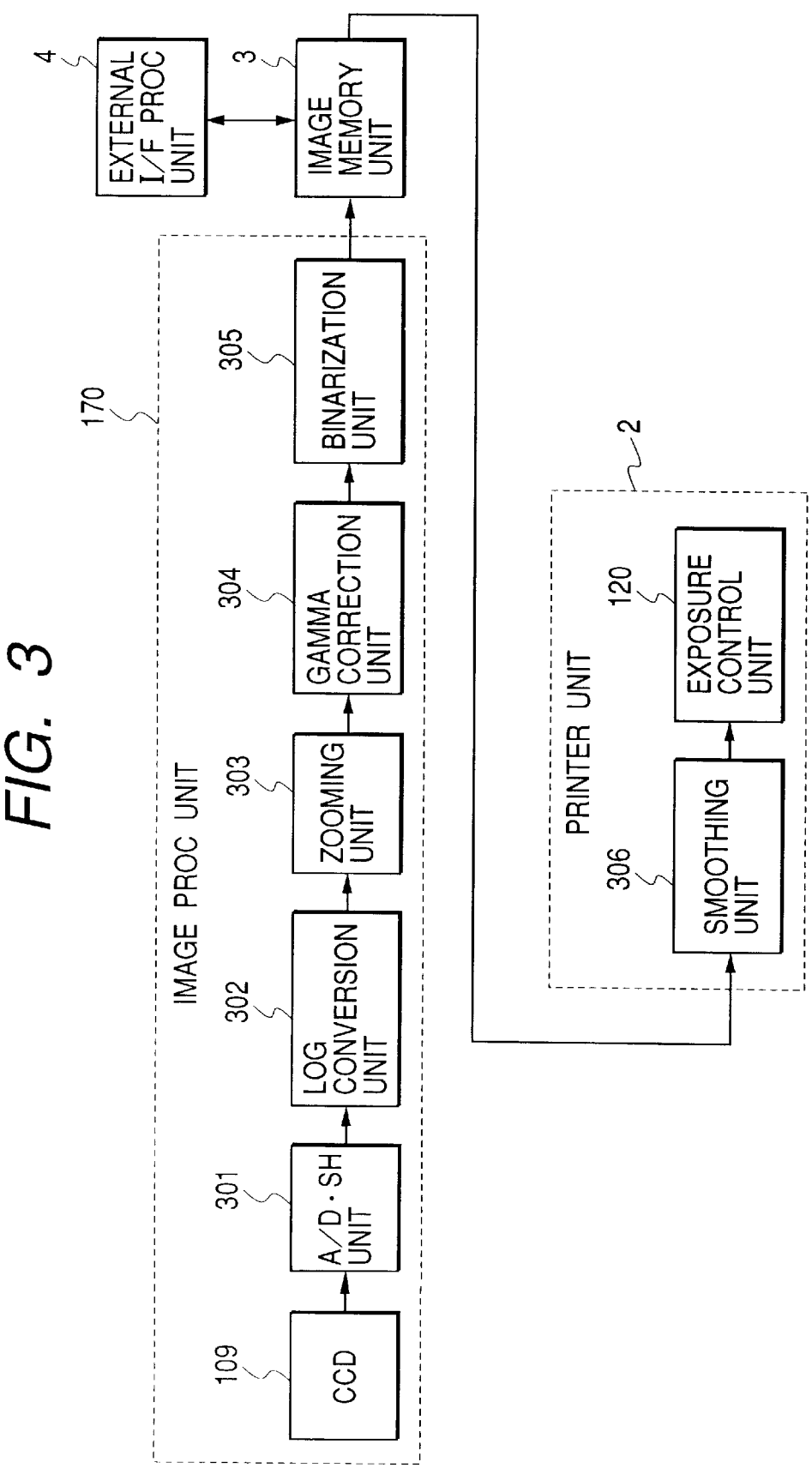
FIG. 3 is a block diagram showing a structure of an image process unit shown in FIG. 2.

FIG. 3 is the block diagram for explaining the structure of the unit 170. It should be noted that, in FIG. 3, the same parts as those in FIG. 2 are respectively added with the same reference numerals.

In the drawing, the original image data (inputted as luminance data of black in the embodiment) inputted in the image sensor unit 109 through the lens 108 shown in FIG. 1 is further inputted to an analog signal process unit (not shown) to be subjected to a sampleand-hold process, a dark level correction and the like.

After then, in an A/D conversion and shading correction (A/D.SH) unit 301, the data from the unit 109 is analog-to-digital (A/D) converted and the obtained digital image signal is shading-corrected (i.e., dispersion of original reading sensors and light distribution characteristic of original illumination lamp are corrected).

After then, the A/D converted image signal is sent to a logarithmic conversion unit 302. A lookup table (LUT) for converting the inputted luminance data into density data is provided in the unit 302, and the LUT converts the luminance data into the density data by outputting a table value corresponding to the inputted data.

After then, a zooming unit 303 zooms the image at desired magnification, and the zoomed image is inputted to a gamma correction unit 304. In the unit 304, in a case where the density data is outputted, the inputted data is converted by using the LUT in consideration of an image output characteristic of a printer to adjust the output according to a density value set by the first operation unit 172.

After then, the gamma-corrected density data is sent to a binarization unit 305. In the unit 305, the multivalue density data included in the image data is binarized, whereby the density value becomes "0" or "255". That is, the eight-bit image data is converted into the binarized one-bit image data of "0" or "1", whereby an amount of the image data to be stored in the memory becomes small.

However, if the image is binarized, the number of gradation is changed from "256" to "2". For this reason, when the data of a much-halftone image such as a photographic image is binarized, generally the image is remarkably deteriorated. Thus, pseudo halftone expression based on the binary data is necessary. In the embodiment, an error diffusion method is used as a pseudo halftone expression method.

In this method, if the density of one image is larger than a threshold, the data of this image is considered as the "255" density data and binarized. On the other hand, if the density is equal to or lower than the threshold, the data is considered as the "0" density data and binarized. Then, a difference between the actual density data and the binarized data is diffused to peripheral pixels as an error signal.

The error diffusion in this method is performed by multiplying an error in the binarization by a weighting coefficient on a previously prepared matrix and then adding an obtained value to the peripheral pixels. Thus, an average density value can be preserved throughout the image, so that the pseudo halftone can be expressed in binary.

The binarized image data is sent to the image memory unit 3 and stored therein. Since the image data is processed as the binary image data in a laterdescribed external interface process unit 4, the image data inputted from the unit 4 is sent to the unit 3 as it is. The image memory unit 3 has a page memory accessible at high speed and a large-capacity memory (i.e., hard disk 404 (FIG. 4) in the embodiment) capable of storing the image data of plural pages.

The data of the plural images stored in the hard disk 404 is outputted in the order according to an edit mode designated on the first operation unit 172 (FIG. 2). For example, if a sorter is designated, the image data of the original bundle sent from the DF 180 is outputted in the reading order. That is, the image data of the original once stored in the hard disk 404 is read in the storing order, such the reading is repeated plural times (corresponding to the desired number of copies), and the obtained data is outputted. Thus, since the image data is outputted in the same order as the page order of the original, the operation can acts as the sorter having plural bins.

The image data outputted from the image memory unit 3 is sent to a smoothing unit 306 in a printer unit 2. In the unit 306, the data is interpolated such that a leading-edge portion of the binarized image becomes smooth, and the obtained data is then outputted to the exposure control unit 120. In the unit 120, the image corresponding to the inputted image data is formed on the photosensitive drum 110 through the previously described process.

The printer unit 2 is composed of, in addition to the smoothing unit 306 and the exposure control unit 120 shown in FIG. 3, the image formation unit 126 and all the feed paths through which the transfer paper is fed.

Hereinafter, details of the image memory unit 3 shown in FIG. 2 will be explained with reference to FIG. 4.

Figure 4:
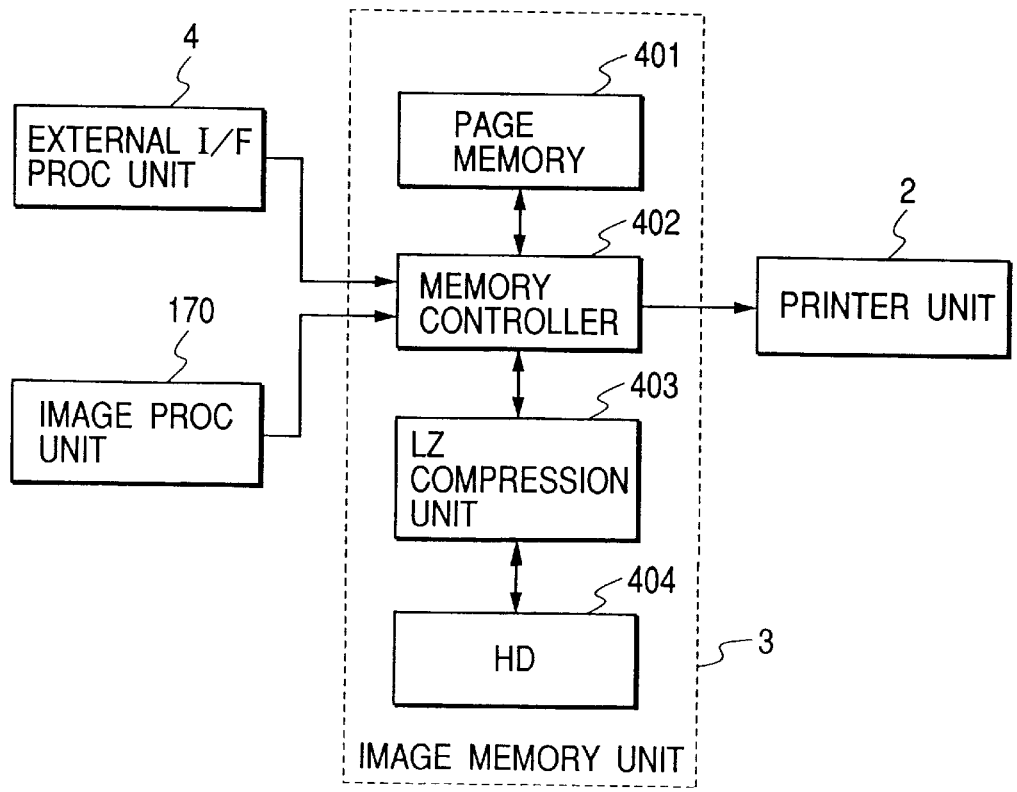
FIG. 4 is a block diagram showing a structure of an image memory unit shown in FIG. 2.

FIG. 4 is the block diagram for explaining a structure of the image memory unit 3 shown in FIG. 2. It should be noted that, in FIG. 4, the same parts as those in FIGS. 2 and 3 are respectively added with the same reference numerals.

In the drawing, numeral 3 denotes the image memory unit which writes the binarized image sent from the external interface process unit 4 and the image process unit 170 into a page memory 401 composed of a memory such as DRAM or the like through a memory controller 402, reads and sends the image to the printer unit 2, and accesses image inputting/outputting to/from the hard disk 404 acting as the large-capacity memory.

Numeral 402 denotes the memory controller which generates a DRAM refresh signal to the page memory 401, and controls the accessing from the external interface process unit 4, the image process unit 170 and the hard disk 404 to the page memory 401.

Further, the memory controller 402 controls management of the writing/reading addresses to/from the page memory 401, a reading direction and the like according to an instruction from the CPU 171. Thus, the CPU 171 controls a function to form a layout of the page memory 401 by arranging the plural original images and output the formed layout to the printer unit 2, a function to cut out only a part of the image and output the cut-out image, and a function to rotate the image.

Numeral 403 denotes an LZ compression unit which compresses and depresses the image data when the image is read from and written into the hard disk 404, respectively.

FIG. 5 is the block diagram for explaining a structure of the external interface process unit 4 shown in FIG. 3. It should be noted that, in FIG. 5, the same parts as those in FIGS. 3 and 4 are respectively added with the same reference numerals.

In the drawing, numeral 4 denotes the external interface process unit which is composed of a core unit 506, a facsimile unit 501, a hard disk 502 for storing communication image data of the unit 501, a computer interface unit 503 connected to an external computer (PC/WS) 11, a formatter unit 504, and an image memory unit 505.

As previously described, the binary image data read by a reader unit 1 and processed in the image memory unit 3 is inputted to the external interface process unit 4. On the other hand, the binary image data in the unit 4 is outputted to the printer unit 2 through the image memory unit 3 to perform the image formation. The reader unit 1 is composed of the scanner 102, the original illumination lamp 103, the scanning mirrors 104 to 106, the lens 108, the image process unit 170 and the like shown in FIGS. 1 and 2.

Numeral 501 denotes the facsimile unit which is connected to a public line such as a telephone line through a modem (not shown), receives facsimile communication data from the public line, and transmits the data to the public line. The facsimile unit 501 has a facsimile function to store a facsimile image in the hard disk 501 and process the stored image. For example, the unit 501 performs facsimile communication at a designated time, and transmits the image data in response to a partner's inquiry of a designated password.

By such the facsimile function, after the image was once transferred from the reader unit 1 to the facsimile unit 501 or the hard disk 502 through the image memory unit 3, it is then possible to perform the facsimile transmission without using the units 1 and 3.

Numeral 503 denotes the computer interface unit performing the data communication to the external computer 11. The computer interface unit 503 contains, e.g., a LAN (local area network), a serial interface, a SCSI (small computer system interface), and a centronics interface used for the printer data input.

Through the computer interface unit 503, states of the printer unit 2 and the reader unit 1 are notified to the external computer 11, the image reading by the reader unit 1 according to an instruction from the computer 11 is transferred to the computer 11, and print image data is received from the computer 11. The print image data notified from the computer 11 through the unit 503 is described by using a dedicated printer code.

Numeral 504 denotes the formatter unit which converts the printer code of the print image data transmitted from the computer 11 into raster image data, to perform the image formation by the printer unit 2 through the image memory unit 3. In this case, the formatter unit 504 expands or depresses the raster image data in the image memory unit 505.

As described above, the image memory unit 505 is used as the memory in which the formatter unit 504 expands the raster image data, or as the area in which, when the image reading by the reader unit 1 through the unit 503 is sent to the external computer 11 (image scanner function), the image data sent from the unit 3 is partially expanded to convert its data format into that suitable for the computer 11.

Numeral 506 denotes the core unit which manages and controls data transfer among the facsimile unit 501, the computer interface unit 503, the formatter unit 504, and the image memory units 505 and 3. Thus, even if the plural image output units (i.e., facsimile unit 501 and computer interface unit 503) are connected to the external interface process unit 4, exclusive control, priority control and image outputting are performed under the management of the core unit 506 only by using the single image transfer path to the image memory unit 3.

Figure 6:
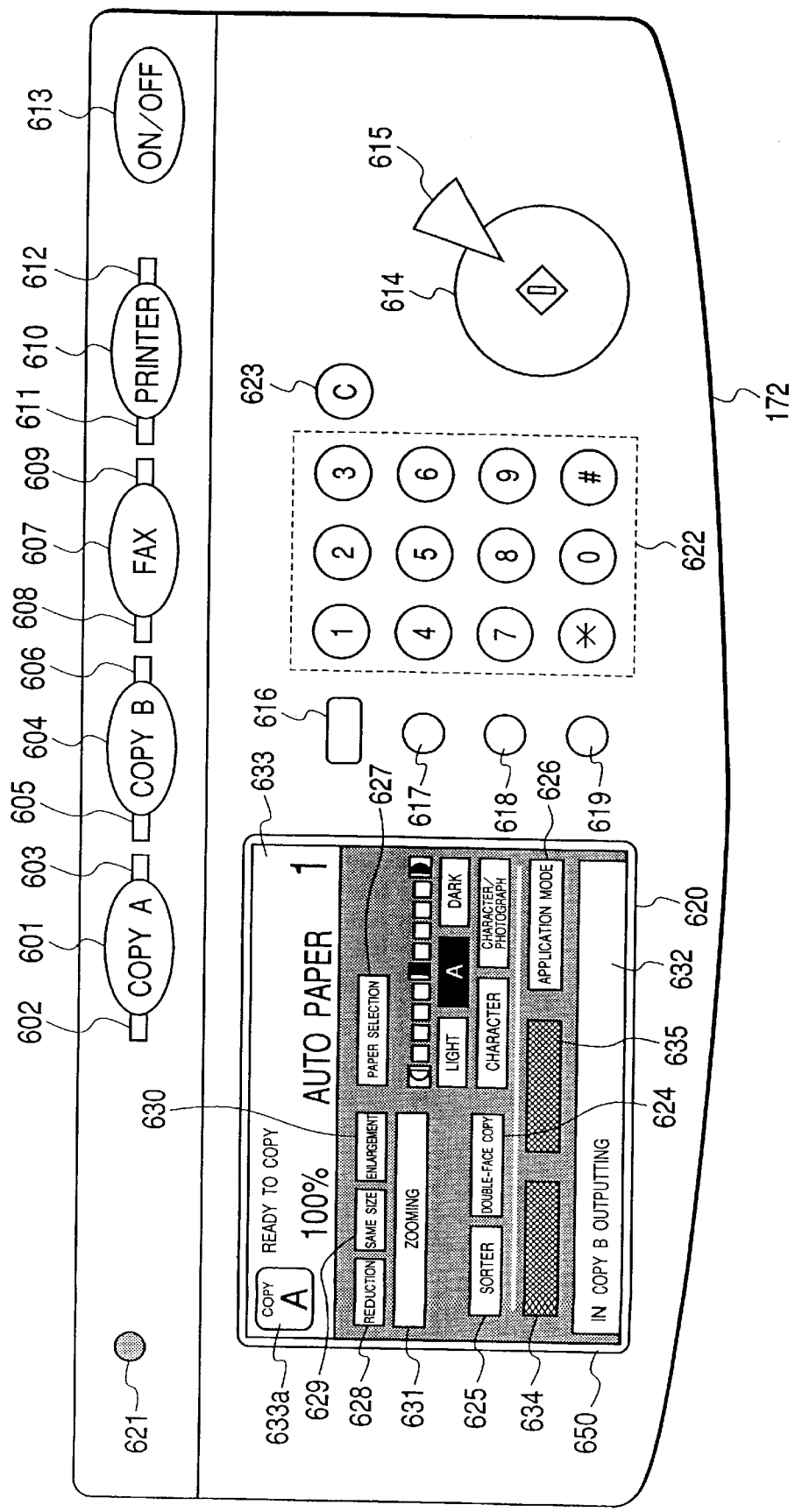
FIG. 6 is a view showing a layout of a first operation unit shown in FIG. 2.

FIG. 6 is the view showing a layout of the first operation unit 172 shown in FIG. 2. By handling various keys arranged on the first operation unit 172, the operator can set the copy operation of the image formation apparatus body 100, instruct the copy operation and perform other operation.

In the drawing, numeral 621 denotes a power lamp indicating a power state. That is, lamp 621 is turned on/off according to power on/off based on a switching operation of a power switch 613.

Numeral 622 denotes a ten-key used when it is necessary to input numerals to the image formation apparatus for setting the number of copies, the mode and the like. Further, in a facsimile setting screen, the ten-key 622 is used to input telephone numbers. Numeral 623 denotes a clear key used to clear the setting inputted by the ten-key 622. Numeral 616 denotes a reset key used to return the setting number of copies, the setting operation mode, the setting selection paper feed berth and the like to their default values.

Numeral 614 denotes a start key. When the start key 614 is depressed, the image formation operation starts. Red and green LEDs (not shown) are provided at the center of the key 614. When starting of the image formation operation is impossible, the red LED is ON. On the other hand, when the starting of the operation is possible, the green LED is ON. Numeral 615 denotes a stop key used to stop the copy operation. Numeral 617 denotes a guide key. When one key is depressed after the guide key 617 was depressed, a later-described display panel 620 displays guidance of the function capable of being set by such the key. When the key 617 is again depressed, such the displayed guidance can be released.

Numeral 618 denotes a user setting key used when the user changes various setting of the image formation apparatus body 100. For example, the user can change the setting of a time when the setting is automatically cleared, the setting of the default (or preset) value at the time of depressing the reset key, and other setting.

Numeral 619 denotes an interruption key. When the interruption key 619 is depressed during the image formation operation, execution of the current image formation operation and execution of later reserved image formation operations are interrupted. Instead, a copy operation not using the DF 180 can be executed.

Numeral 620 denotes the display panel having a liquid crystal display and the like, and having touch sensors on its surface. In order to easily perform the detailed mode setting, the display panel 620 displays various screens (or image planes) each different from others according to the setting mode. For example, FIG. 6 shows a copy A setting screen 650 which displays a copy A mode being one of plural copy modes. Further, keys 624 to 631 are displayed on the panel 620. Thus, by touching a position at which the specific key is displayed, the operator can set the desired mode indicated by such the specific key.

Numeral 627 denotes the paper selection key used to select a paper berth. When the key 627 is depressed, the panel 620 displays a screen used to set which of the cassettes 131 and 132 and the deck 150 is used for feeding the paper. Numerals 628 to 631 denote the magnification setting keys. By depressing one of the keys 628 to 630, a desired regular (or fixed) magnification can be selected. On the other hand, after the key 631 was depressed, a zooming magnification can be manually set by inputting desired numerals.

Numeral 626 denotes the application mode setting key. When the key 626 is depressed, the panel 620 displays a screen used to set application fu nction modes such as a multicopy operation mode, a reduction layout mode, a cover sheet synthesis mode and the like. For example, the panel 620 displays an application mode selection screen 700 (later described in FIG. 7) showing setting keys of various application function modes, to enable various setting of the application modes.

Numeral 624 denotes the double-face operation setting key. For example, by using the key 624, three kinds of double-face modes, i.e., "single-double mode" to perform double-face outputting from a single-face original, "double-double mode" to perform the double-face outputting from a double-face original, and "double-single mode" to perform two single-face outputting from the double-face original. Numeral 625 denotes the sorter key. When the sorter key 625 is depressed, an operation mode of the paper discharge process unit 190 and a sorting mode of the output sheets using the image memory unit 3 are set.

As above, the display panel 620 displays the various keys. However, in a case where the mode corresponding to the displayed key can not be set, the panel 620 displays the screen different from the ordinary screen. For example, the panel 620 can indicate that the displayed key is inoperable by displaying dotted lines (or meshed lines) which are ordinarily displayed as solid lines.

Numeral 633 denotes a function setting display area for displaying the setting contents of the copy operation and the like. On the left of the area 633, a display area 633a for displaying that the currently displayed screen corresponds to which of laterdescribed function modes is provided. In the drawing, since the setting screen 650 for the copy A is displayed on the panel 620, "copy A" is displayed. It should be noted that, although characters are used to discriminate the function in the embodiment, a symbol (numerical symbol, icon or the like) indicating the function included in the body 100 may be used.

Numeral 632 denotes an operation display area for displaying an operation state of the later-described other function mode or a currently processed operation state, within a range capable of displaying single-line information. In the drawing, e.g., the area 632 displays that a copy B is in an output operation to the printer unit.

Numerals 634 and 635 respectively denote desirable keys. By depressing the desirable key 634 or 635, the user can set a desired item (function capable of being set by using application mode setting screen) registered on a desirable key setting screen 800 (later described in FIGS. 8A and 8B). In the drawing, since any function is not registered, meshes are displayed on the keys 634 and 635.

Numerals 601, 604, 607 and 610 respectively denote switch keys (or change keys). When the switch key is depressed, the screen displayed on the first operation unit 172 is changed to newly set the other functions such as the copy operation, the system operation and the like using the body 100. In the drawing, although the setting screen 650 for the copy A is displayed on the panel 620, e.g., if the switch key "printer" 610 is depressed, the screen is changed to a not-shown setting screen for the printer.

The switch keys 601, 604, 607 and 610 are semitransparent key buttons, and each key contains therein a display lamp (not shown) such as an LED or the like. When operation screen is selected by depressing the switch key, the display lamp in the depressed key is turned on. That is, it is controlled that only the lamp in the key corresponding to the selected setting screen is turned on, and the lamps in the other keys are turned off.

Each of the switch keys 601, 604, 607 and 610 can be depressed at any time irrespective of operation states of the respective functions. When the switch key is depressed, operation targets of the keys 614 to 619, 622 and 626 on the first operation unit 172 are changed or switched. For example, in such a case as in the embodiment where it is possible to switch the function between a copy A function and a copy B function, the start key 614, the stop key 615, the reset key 616 and the like other than the keys displayed on the panel 620 are operated on the function selected by the switch key 601 or 602.

That is, e.g., in the case where the copy A setting screen 650 is being displayed, when the stop key 615 is depressed, it is impossible to stop the copy in the copy B output operation. If it is intended to stop the copy for the copy B, it is necessary that the switch key "copy B" 604 is once depressed and then the stop key 615 is depressed. Thus, the output operation for the copy B stops.

Numerals 603, 606, 609 and 612 denote green LEDs, each arranged on the right of each switch key. Each LED is turned on to indicate the operation state of each function.

For example, the LED 606 of the copy B is controlled to be OFF during the copy B is on standby. On the other hand, when the copy B is in the output operation as in FIG. 6, the LED 606 is turned on and off repeatedly. Further, in a case where the image of the copy B has been stored in the hard disk 404 of the image memory unit 3 but the print operation of the copy B is not yet performed, the LED 606 is controlled to be ON.

Similarly, the LED 609 of the facsimile is turned on and off repeatedly during the communication operation, the print operation and the reading operation. In a case where the facsimile image has been stored in the hard disk 502 connected to the facsimile unit 501 shown in FIG. 5, the LED 609 is controlled to be ON.

Numerals 602, 605, 608 and 611 denote red LED, each arranged on the left of each switch key. Each LED is turned on to indicate that abnormality occurs in each function. For example, the LED 605 of the copy B is turned on and off repeatedly when the abnormality such as paper-empty interruption, jam or the like occurs while the image formation apparatus body 100 performs the copy B function.

At this time, if the switch key "copy B" 604 is depressed to change the displaying on the first operation unit 172 to that of the copy B setting screen, the state of the copy B is displayed on the display panel, whereby the operator can confirm the details of the abnormality.

The setting operation to set the data by using the user setting key 618 can be independently performed on the selected one of the copy A and copy B screens of the first operation unit 172. That is, each screen independently contains the necessary data.

Figure 7:
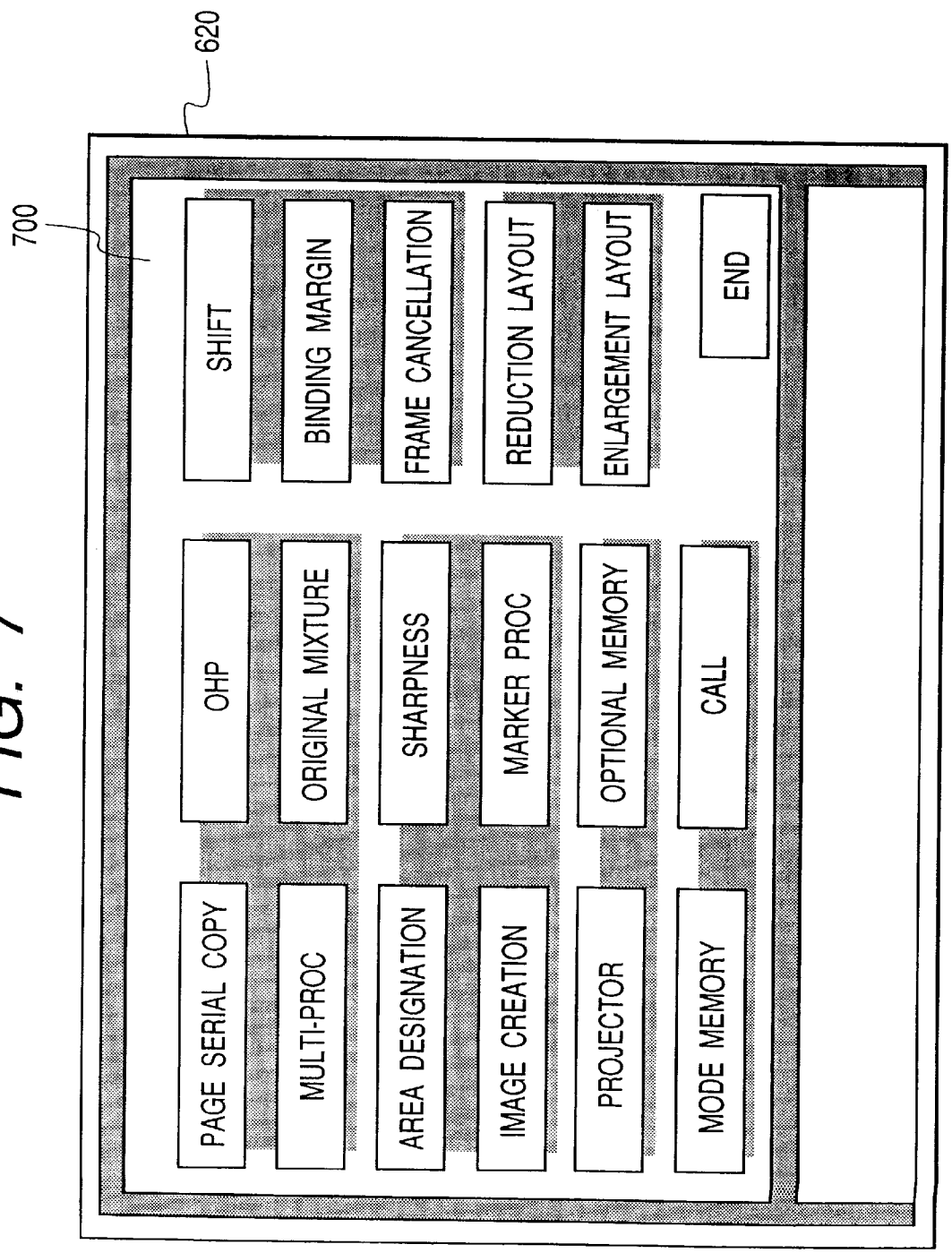
FIG. 7 is a view for explaining an example of an application mode selection screen on a display panel shown in FIG. 6.

FIG. 7 is a view for explaining an example of the application mode selection screen displayed on the display panel 620 shown in FIG. 6.

In the drawing, numeral 700 denotes the application mode selection screen displayed when the application mode setting key 626 shown in FIG. 6 is depressed. Concretely, the screen 700 displays the keys "page serial copy", "multicopy", "area designation", . . . , and "enlargement layout" respectively used to set the various functions of the body 100. That is, when the above key on the screen 700 is depressed, the screen necessary to set each item is displayed.

Figure 8A:
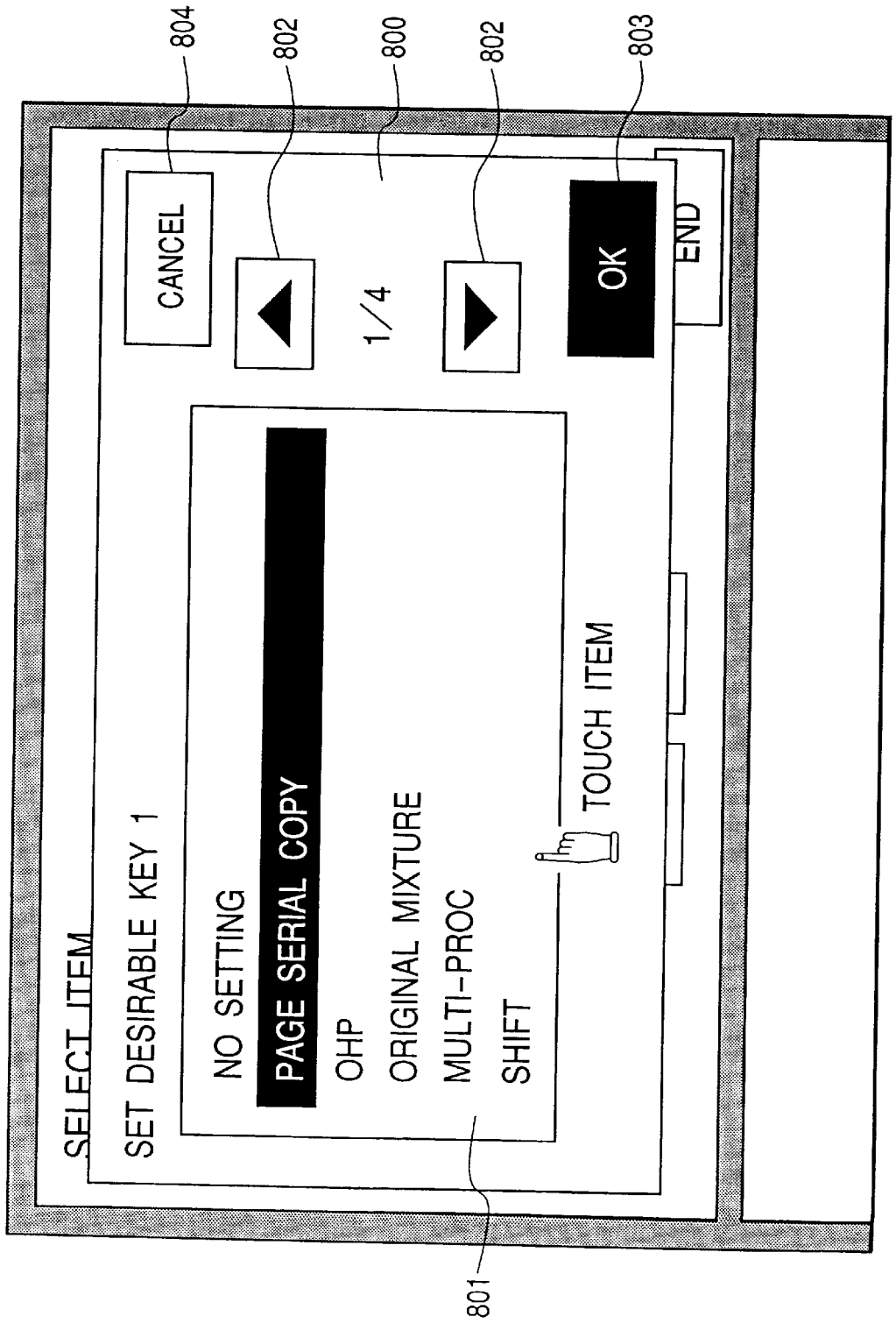
FIG. 8A is a view for explaining an example of a desirable key setting screen on the display panel shown in FIG. 6.
Figure 8B:
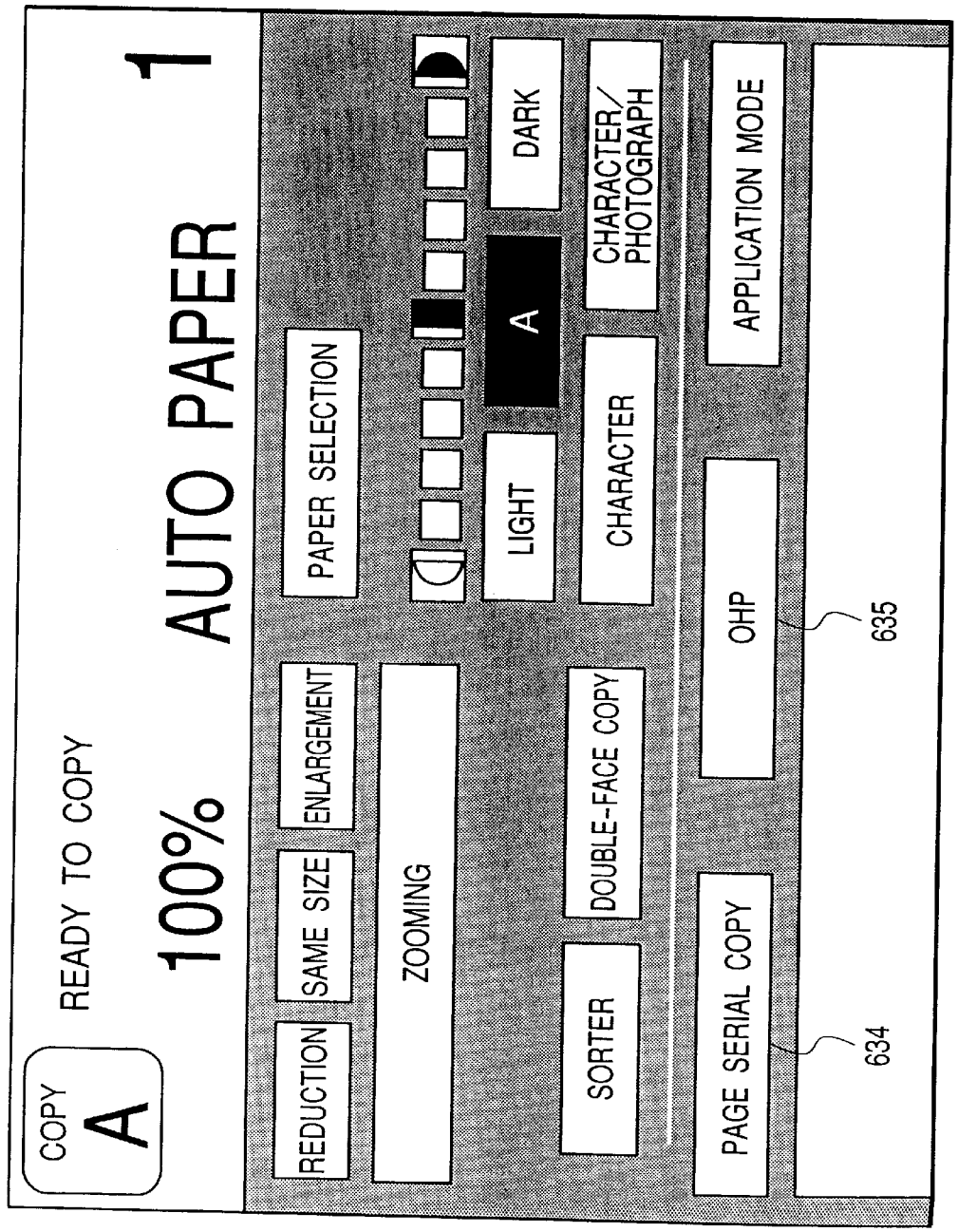
FIG. 8B is a view for explaining an example of a copy A setting screen on the display panel displaying registered desirable keys.

FIG. 8A is the view for explaining an example of the desirable key setting screen on the display panel 620 shown in FIG. 6, and FIG. 8B is the view for explaining an example of the copy A setting screen on the display panel 620 for displaying registered desirable keys.

In FIG. 8A, numeral 800 denotes the desirable key setting screen used to set the items of the desirable keys 634 and 635. This screen is displayed by selecting the setting of the desirable key 634 or 635 at the setting item of a user setting screen (not shown) displayed after the user setting key 618 was depressed.

Numeral 801 denotes a function selection area. When the desired item is displayed within the function selection area 801 by operating scroll keys 802 and then this item is depressed, the depressed item can be selected. In the drawing, the item "page serial copy" is selected and thus reversely displayed. This selected item can be registered to the desirable key by depressing an "OK" key 803. Numeral 804 denotes a cancel key depressed when the registration to the desirable key is stopped.

Thus, even if the plural setting keys within the application mode selection screen 700 shown in FIG. 7 are not selected by depressing the application mode setting key 626, since the functions "page serial copy" and "OHP" have been registered respectively at the desirable keys 634 and 635 and thus these keys are displayed to be used as ordinary keys (i.e., not meshed keys), the setting screen of "page serial copy" or "OHP" is displayed on the display panel 620 by depressing the registered key.

As above, since the key corresponding to the function frequently used by the user is independently provided in the embodiment, the setting screen desired by the user can be displayed only by depressing one registered key without complicated operation.

Hereinafter, an operation method to change an output inquiry order registered in a print output queue will be explained with reference to FIG. 9.

FIG. 9 is the view for explaining an example of an output order display screen for displaying a state of the print output queue. The print output queue is displayed on the display panel 620 shown in FIG. 6.

In the drawing, numeral 900 denotes the output order display screen for displaying output inquiries and their states in the output queue. Numeral 907 denotes an output queue display area in which the states of a currently outputted job and Jobs waiting for the outputting are displayed. The screen 900 displays that the copy B is being outputted, and thereafter a copy C, a printer job of reception No. 110, the copy A and a printer job of reception No. 111 are sequentially outputted in due order. Therefore, when the outputting of the copy B terminates, then the outputting of the copy C is performed.

Further, if a part representing a job name in the area 907 is depressed, the job corresponding to such the name can be selected. In the drawing, the copy A being the third job in the output queue is being selected and reversely displayed. Further, it is controlled that the currently outputted job (copy B in FIG. 9) can not be selected.

Numeral 903 denotes a return key used to stop the input operation on this screen and return the screen to original one. Numeral 905 and 906 denote cursor keys used to scroll the screen when it is impossible to display all the jobs in the output queue within the output queue display area 907. That is, if the downward cursor 905 is depressed, fifth to eighth jobs in the queue are displayed instead of the currently displayed first to fourth jobs.

Numeral 902 denotes a cancel key used to cancel or delete the job in the output queue. That is, when the job to be cancelled is selected by using the touch key and the cancel key 902 is subsequently depressed, the output operation in such the job can be cancelled. However, it is controlled that the currently outputted job (copy B in FIG. 9) can not be selected in this screen.

Numeral 904 denotes a detailed information key. When the job of which detailed information is intended to be displayed is selected and the key 904 is subsequently depressed, processing contents of the selected and outputted job are displayed. As such the contents, e.g., there are the number of copies, the number of originals, an output mode (double-face output, etc.) and the like.

Numeral 901 denotes a priority key. When the job intended to be preferentially outputted is selected and the priority key 901 is subsequently depressed, the selected job is moved at the top (i.e., first job) of the output queue. At this time, each of the jobs of which order are smaller (i.e., earlier) than that of the selected job is moved down by one in order. For example, the copy A job at the third order is being selected in the drawing. However, if the priority key 901 is depressed in this state, the order in the output queue is changed to be the copy A (first order), the copy C (second order), the printer job of reception No. 110 (third order).

Further, in order that a job newly registered in the output queue after the priority was changed is not set at the top of the queue, the priority of the job changed to be the first job is set to be highest as compared with those previously set for the respective jobs such as the copy, the printer and the like. Thus, even if the new job or function is registered in the output queue, such the job or function is never registered before the job of which priority has been changed to be highest in the queue.

Hereinafter, a process at the time of data setting in the user setting mode will be explained with reference to FIG. 10.

Figure 10:
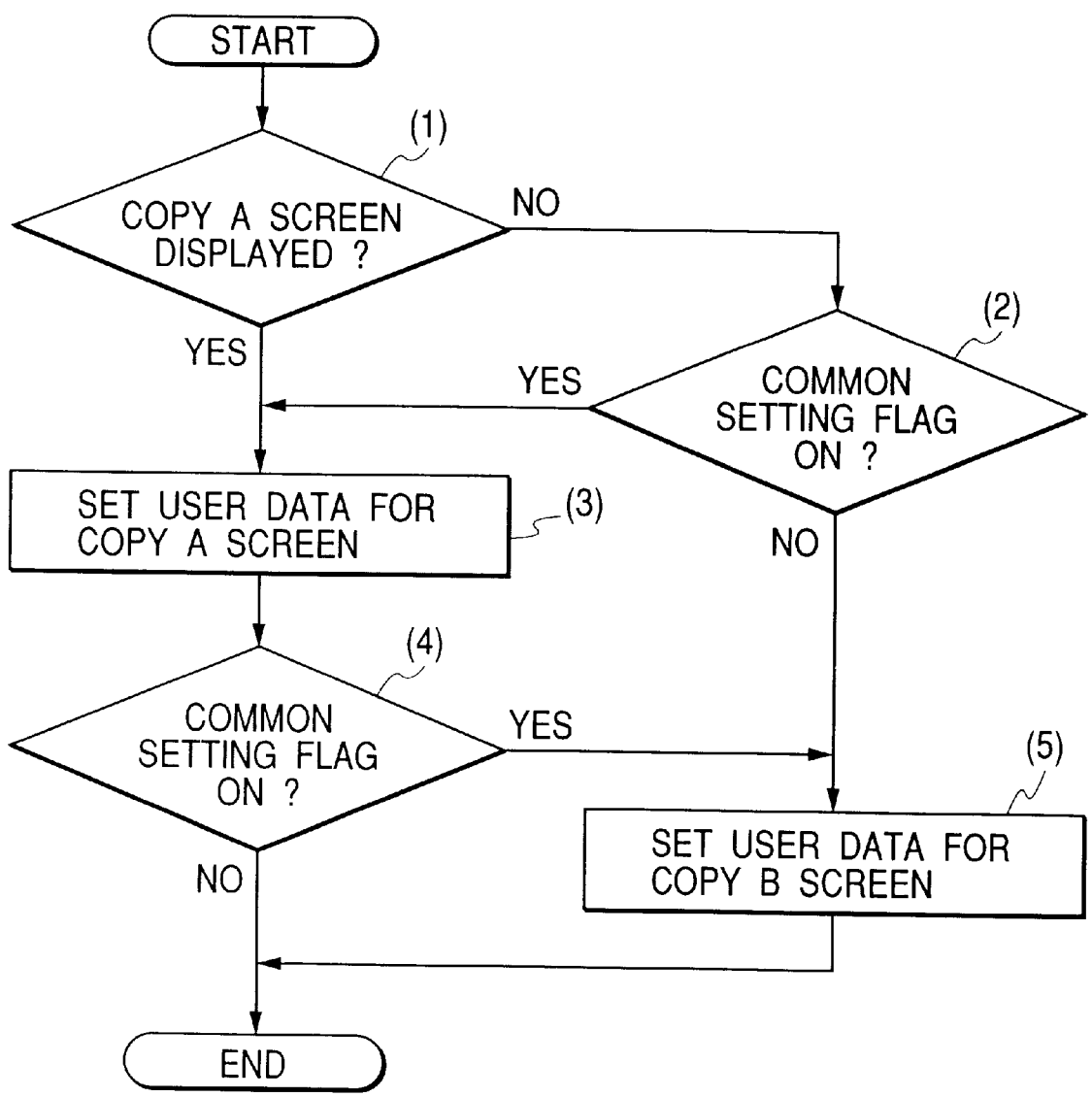
FIG. 10 is a flow chart showing an example of first data process procedure in the image formation apparatus according to the present invention.

FIG. 10 is the flow chart showing an example of first data process procedure in the image formation apparatus according to the present invention. This chart corresponds to a subroutine process called when the data setting has been established in the user setting mode. It should be noted that, in the drawing, numerals (1) to (5) denote respective steps.

Initially, it is judged whether or not the copy A screen is displayed on the display panel 620 shown in FIG. 6 (1). If judged that the copy A screen is displayed, the flow advances to the step (3). On the other hand, if judged that the screen is not displayed, i.e., that the copy B screen is displayed, then it is judged whether or not a common setting flag is set to be ON, i.e., whether or not the user data in the copy A job and copy B job are common (2). If judged that the flag is set to be ON, the flow advances to the step (3) to write the setting data of the copy B job into the setting data area of the copy A job.

On the other hand, if judged that the flag is not set to be ON, the set user data is written into the user setting data area of the copy B (5), and the process terminates.

On the other hand, in the step (3), the set user data is written into the user setting data area of the copy A, and it is again judged whether or not the common setting flag is set to be ON (4). If judged that the flag is not set to be ON, the process terminates.

In the meantime, if judged that the flag is set to be ON, the set user data in the copy A job is written into the user setting data area of the copy B (5) to write the setting data in the copy A job into the setting area of the copy B. Then, the process terminates.

That is, by providing such a switch means as above, the user setting data essentially capable of being set for each screen can be common by both the copy A screen and the copy B screen. Thus, an identical environment can be easily provided in both the copy A job and the copy B job. Moreover, the screen setting according to peculiar usage in each of the copy A job and copy B job can be realized.

Hereinafter, an example of a control flow chart of the copy operation will be explained with reference to FIGS. 11 to 13.

Figure 11:
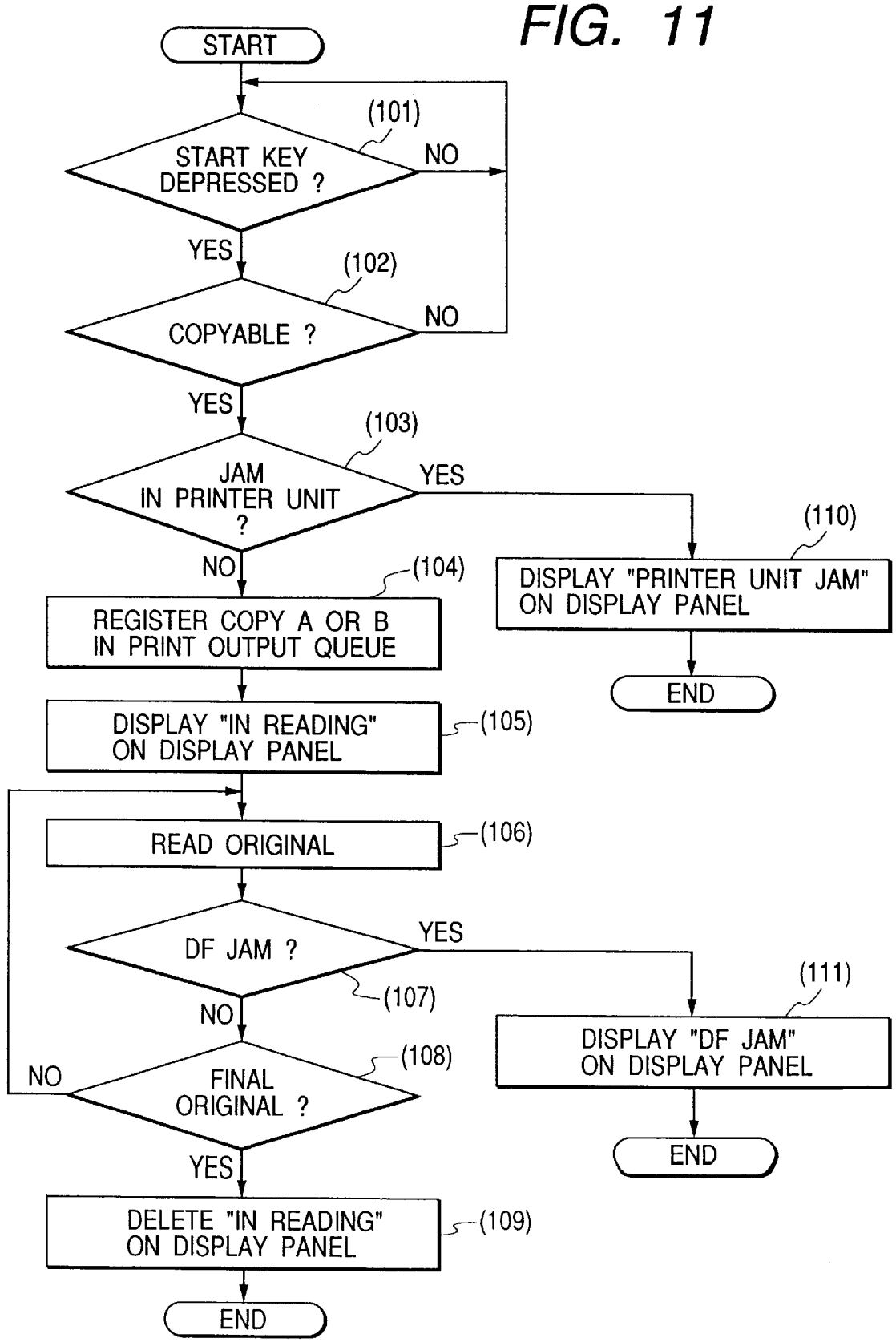
FIG. 11 is a flow chart showing an example of second data process procedure in the image formation apparatus according to the present invention.

FIG. 11 is the flow chart showing an example of second data process procedure in the image formation apparatus according to the present invention. This chart corresponds to data process procedure at a time when the image reading in the copy A or B operation is controlled. In FIG. 11, it should be noted that the process shown is called by a main sequence at every constant time or according to necessity, and that numerals (101) to (111) denote respective steps.

Initially, it is judged whether or not the start key 614 shown in FIG. 6 is depressed (101). At this time, it is necessary that the copy A or the copy B has been selected by the switch key 601 or 602. If judged that the key 614 is not depressed, the flow returns to the step (101) to wait for key depression.

On the other hand, if judged in the step (101) that the key 614 is depressed by the user, then it is judged whether or not the copy start is possible (102). In this case, when the reading operation of the copy B or copy A is being performed, or when the reading operation in the facsimile function is being performed, it is judged that the copy start is impossible. Moreover, when the set copy operation mode is inoperable, e.g., when a set paper feed cassette contains no paper, when the copy operation is designated with a paper size incapable of being managed by the paper discharge process unit 190, or the like, it is also judged that the copy start is impossible.

If judged in the step (102) that the copy start is impossible, the flow returns to the step (101). At this time, the state that the copy start is impossible may be displayed on the display panel 620 of the first operation unit 172.

On the other hand, if judged in the step (102) that the copy start is possible, then it is judged whether or not abnormality such as jam or the like occurs in the printer unit 2 due to the print output operation of the other function (103). If judged that the abnormality occurs, occurrence of abnormality such as jam or the like in the printer unit 2 is displayed on the panel 620 of the first operation unit 172 (110), and then the process terminates.

The checking of abnormality in the printer unit 2 (step (103)) may be performed and displayed at the same time when the depression of the start key 614 is judged in the step (101).

On the other hand, if judged in the step (103) that the abnormality does not occur in the printer unit 2, the copy A job or copy B job is registered in the output queue which is provided to control or manage the order of print output (104). In this case, the job is registered in the queue according to information concerning the priority previously determined for the function of each job. For example, the output queue is searched from its end to find the function of the already registered job of which priority is equal to or higher than that of the job currently registered, and such the currently registered job is registered after the found job in the output queue.

By doing so, the respective jobs are registered from the top of the queue in the order to be processed. Thus, if the priority of the function of the currently registered job is higher than those of the already registered jobs in the queue, the currently registered job is processed before the already registered jobs are processed.

Subsequently, it is displayed within the operation display area 632 on the display panel 620 of the first operation unit 172 that the reader unit 1 is in the original image reading operation (105). Then, the original is fed onto the platen glass 101 by the DF 180, the original mounted on the glass 101 is scanned to read the image thereon, the read image is subjected to the zooming process and the like by the image process unit 170 (FIG. 3) according to the mode set by the first operation unit 172, and then the processed image is written into the page memory 401 in the image memory unit 3 (106).

The image written into the unit 3 is stored in the hard disk 404 through the LZ compression unit 403. After then, the original on the platen glass 101 is discharged. In this case, the images stored in the hard disk 404 are added with numbers in the image reading order for convenience in management. In this management, the information for managing the number of originals is added with "1".

Subsequently, it is Judged whether or not feeding abnormality occurs in the DF 180 (107). If judged that the abnormality occurs, it is displayed on the display panel 620 of the first operation unit 172 of the copy A or B that the original feeding state of the DF 180 is abnormal (111). At this time, in a case where the image reading is performed as the original is fed by the DF 180, it can not be assured that the original finally read was normally fed and the image data of such the original has been read as a whole. Therefore, the above management information is returned to its initial state, the image data in the hard disk 404 is deleted, and then the process terminates.

On the other hand, if judged in the step (107) that the abnormality does not occur, then it is judged whether or not the original finally read is the final image (108). If Judged that such the original is not the final image, the flow returns to the step (106) to feed the next original. This operation is repeated until all the originals are processed.

In the meantime, if judged that such the original is the final image (108), the contents displayed within the operation display area 632 on the display unit 620 and indicating that the image reading is being performed are deleted (109), and then the process terminates.

Figure 12:
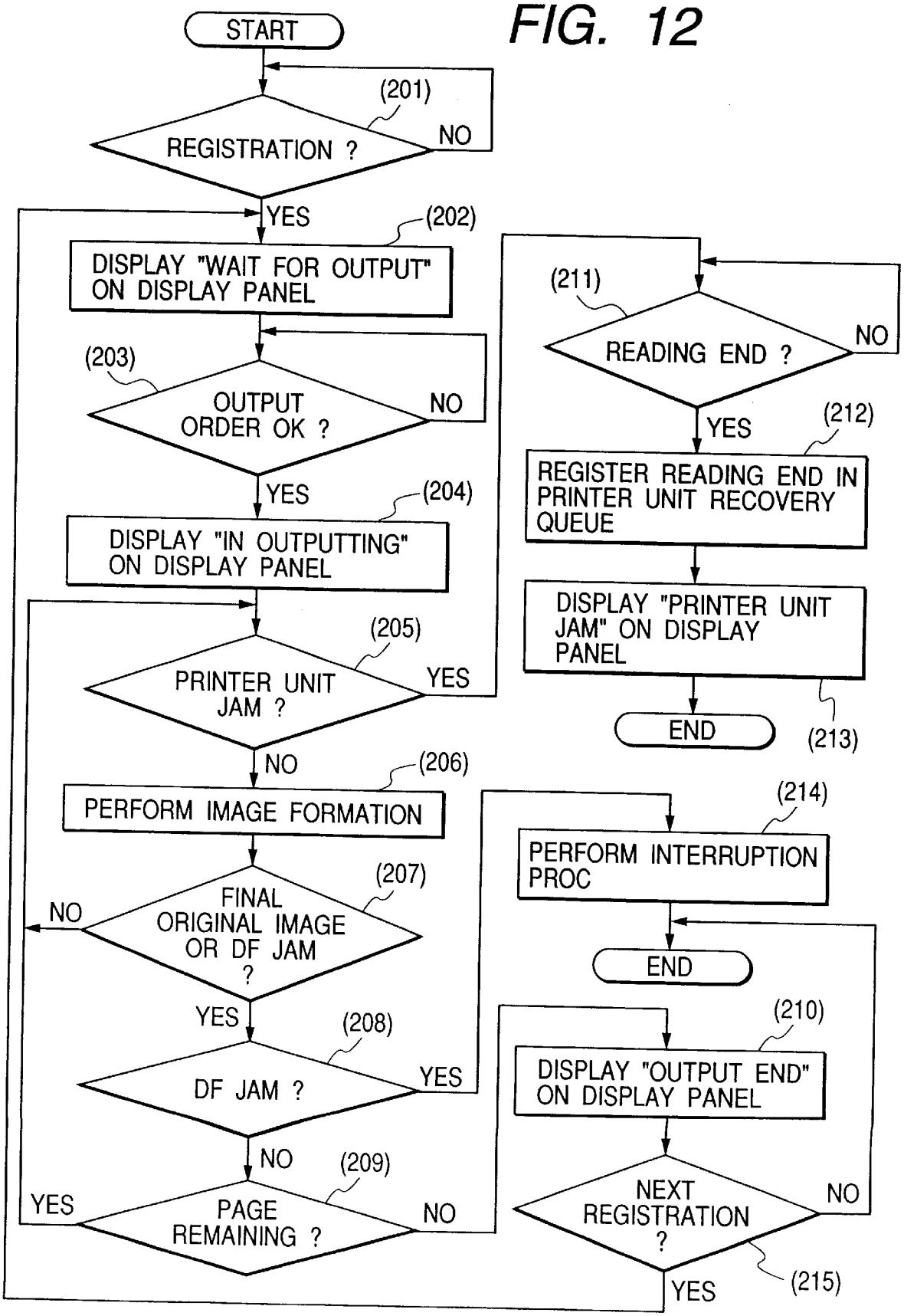
FIG. 12 is a flow chart showing an example of third data process procedure in the image formation apparatus according to the present invention.

FIG. 12 is the flow chart showing an example of third data process procedure in the image formation apparatus according to the present invention. This chart corresponds to data process procedure at a time when the image formation in the copy A or B operation is controlled. In FIG. 12, it should be noted that the process shown is called by the main sequence at every constant time or according to necessity, and that numerals (201) to (215) denote respective steps.

Initially, it is judged whether or not the print output inquiry of the copy A or B has been registered in the print output queue (201). If judged that the inquiry is not registered yet, the process waits for the operation to register the inquiry.

On the other hand, if judged in the step (201) that the inquiry has been registered, the display panel 620 of the first operation unit 172 of the copy A or B displays a print output wait (202). It is controlled that such a message is displayed on the operation display area 632 within the setting screen of the panel 620, together with the above-described state of the reader unit 1, e.g., a message representing that the unit 1 is reading the original image.

Subsequently, an output order checking subroutine based on the flow chart of FIG. 13 (later described) is called, and it is judged whether or not the order of next print output in the print output queue is the copy A or B (203). If judged that the order is not the copy A or B, the flow returns to the step (203). On the other hand, if judged that the order is the copy A or B, the display panel 620 of the first operation panel 172 of the copy A or B displays that the copy A or B is in print outputting (204).

Then, it is judged whether or not the abnormality such as jam, paper empty or the like occurs in the printer unit 2 (205). At this time, the abnormality in the unit 2 occurred before the print operation of the copy A or B starts is also checked. Such the abnormality occurred before the print operation of the copy A or B starts is the abnormality due to the print operation of the other job.

If judged in the step (205) that the abnormality does not occur, the flow advances to the step (206). On the other hand, if judged that the abnormality occurs, then it is judged whether or not the reading operation of the copy A or B terminates (211). If judged that the reading operation does not terminate yet, the process waits for the termination.

On the other hand, if judged in the step (211) that the reading operation terminates, the current job is registered in a recovery queue to restart the printer output (212). It should be noted that, in the recovery queue, the job is processed in the order registered. After then, the display panel 620 displays the abnormality in the printer unit 2 (213), and the process terminates.

On the other hand, if judged in the step (205) that the abnormality does not occur in the printer unit 2, the image is read from the hard disk 404 in the image memory unit 3 in the image formation order, the read image is subjected to an edit process according to the image formation mode set at the first operation unit 172, and the processed image is then expanded in the page memory 401. At this time, if the setting mode is the layout mode or the like, the plural original images are read, and the read images are subjected to layout on the memory 401 and then expanded.

After then, the image is outputted to the printer unit 2, and the above-described image formation is performed on the inputted image (206). That is, the transfer paper is fed from the cassette, the image is formed on the fed paper in synchronism with the image sent from the image memory unit 3, and the obtained paper is discharged outside the apparatus. In the step (206), if the original reading necessary for next image formation is not performed yet and there is no image data of the next-processed original in the hard disk 404, the process waits for the data storage in the disk 404.

Subsequently, it is judged whether or not the image obtained in the image formation is the image of the final original and whether or not the abnormality occurs in the DF 180 in the reading operation of the copy A or B (207). If judged that the obtained image is not the image of the final original and that the abnormality does not occur in the DF 180, the flow returns to the step (205) to judge whether or not the abnormality occurs in the printer unit.

On the other hand, if judged in the step (207) that the obtained image is the image of the final original or that the abnormality occurs in the DF 180, it is further judged whether or not the abnormality occurs in the DF 180 in the reading operation of the copy A or B (208). If judged that the abnormality occurs, the image formation operation is interrupted (214), and the process terminates. At this time, since the recording sheets being halfway through the copy output in the first copy of the copy A or B remain on the process tray 193 of the paper discharge unit 190, such information as representing that the print operation is being performed is set based on internal management information to lock the operation, such that the print operation of the other function or job does not start. Then, the process terminates.

On the other hand, if judged in the step (208) that the abnormality does not occur, then it is judged whether or not the image formation corresponding to the number of copies set at the first operation unit 172 has completed (209). If judged that the image formation does not terminate yet, the flow returns to the step (205). On the other hand, if judged that the image formation has completed, the display panel 620 of the first operation unit 172 displays that the print output of the copy A or B terminates (210).

Subsequently, it is judged whether or not the print output inquiry of the copy A or B has been registered in the print output queue (215). If judged that the inquiry is not registered yet, the copy image formation operation terminates. On the other hand, if judged in the step (215) that the inquiry has been registered, the flow returns to the step (202). Then, the processes from the steps (202) to (215) are repeated until the print output inquiry of the copy A or B empties.

Hereinafter, a flow chart of an output order checking subroutine will be explained with reference to FIG. 13.

Figure 13:
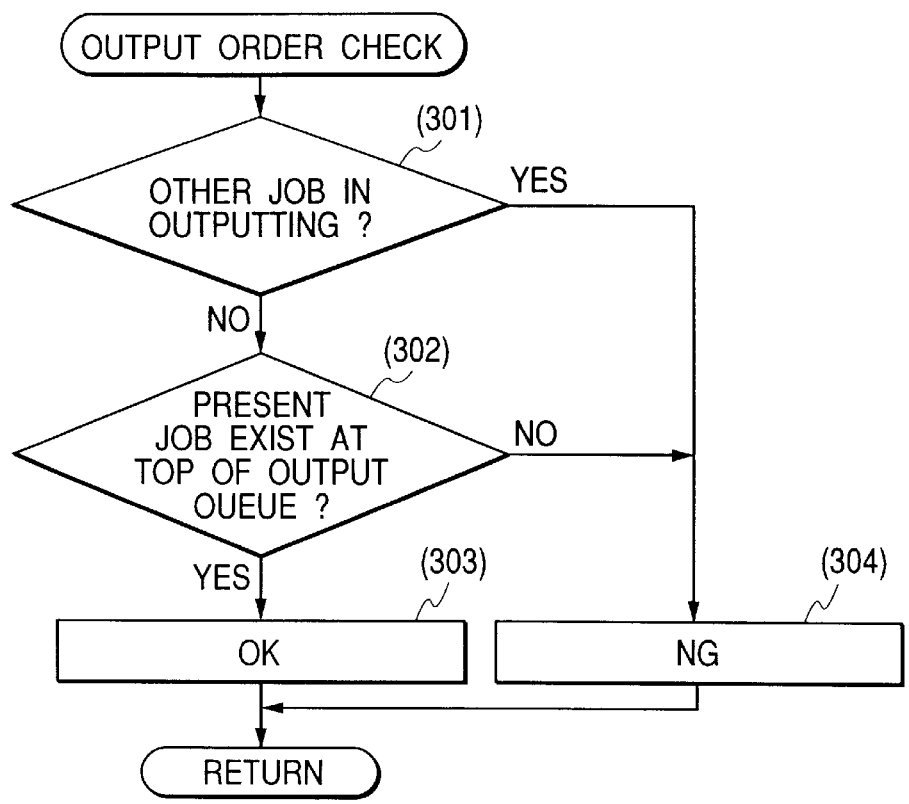
FIG. 13 is a flow chart showing an example of fourth data process procedure in the image formation apparatus according to the present invention.

FIG. 13 is the flow chart showing an example of fourth data process procedure in the image formation apparatus according to the present invention. This chart corresponds to the process in the subroutine called and executed in the step (203) in FIG. 12. It should be noted that numerals (301) to (304) denote respective steps.

Initially, it is judged whether or not the job other than the function to be checked is in the output operation (301). If judged that the job is in the output operation, it is set to a return value that the output order is "NG" (204), and the flow leaves from the subroutine.

On the other hand, if judged in the step (301) that the job is not in the output operation, then it is judged whether or not the current job is at the top of the output queue (302). If judged that the current job is not at the top, the flow advances to the step (304), and it is set to the return value that the output order is "NG". Then, the flow leaves from the subroutine.

On the other hand, if judged in the step (302) that the current job is at the top of the queue, the output inquiry of current job is released from the queue, and it is set to the return value that the output order is "OK" (303). Then, the flow leaves from the subroutine.

As described above, during the image process in one image process mode, in the case where the same image process mode is registered, it is possible to automatically start the subsequent image process every time the previous image process terminates. Therefore, a conventional load for the operator who instructs the apparatus to start each image formation can be. remarkably reduced.

Further, in the case where the abnormality in the original feed unit or the image formation unit is detected, the display unit promptly displays that the abnormality occurs. Therefore, the user can easily and clearly know such the state.

Furthermore, in the state that the plural copy jobs have been registered, in the case where the abnormality is detected during the image process by one copy job, the setting screen for the other copy job can be replaced by that for the copy job in which the abnormality was detected. Therefore, the confusion of the copy job in which the abnormality occurs with the other copy jobs can be prevented, and thus the user can easily and clearly know such the state.

Furthermore, in the state that the plural copy jobs have been registered, in the case where the abnormality is detected during the image process by one copy job, the setting screen can be replaced by the screen for the copy job in which the abnormality was detected, after reading all the originals without interrupting halfway the original reading in the subsequent copy jobs. Therefore, the process to again read the original for the next copy job can be made unnecessary, and a period of time from the release from abnormality to the start of next copy job can be shortened, so that efficiency in the copy job process can be remarkably improved.

Second Embodiment

In the above-described first embodiment, the case where the plural switch keys 601, 604, 607 and 610 are provided on the first operation unit 172 was explained. However, it may be structured that the functions can be switched to others on the screen displayed on the display panel 620. Further, in the first embodiment, the user setting process in which the setting is performed by using the program was explained. However, it may be structured that memory access is managed or controlled by using a data common bus controller to store such the user setting. Furthermore, in the first embodiment, the original is read after registering it in the print output queue. However, it may be structured that all the originals are read and then the read originals are registered in the print output queue. Hereinafter, the second embodiment showing such modifications as above will be explained.

It should be noted that, since a structure of an image formation apparatus according to the second embodiment is identical with that of the apparatus according to the first embodiment, detailed explanation thereof is omitted.

Figure 14:
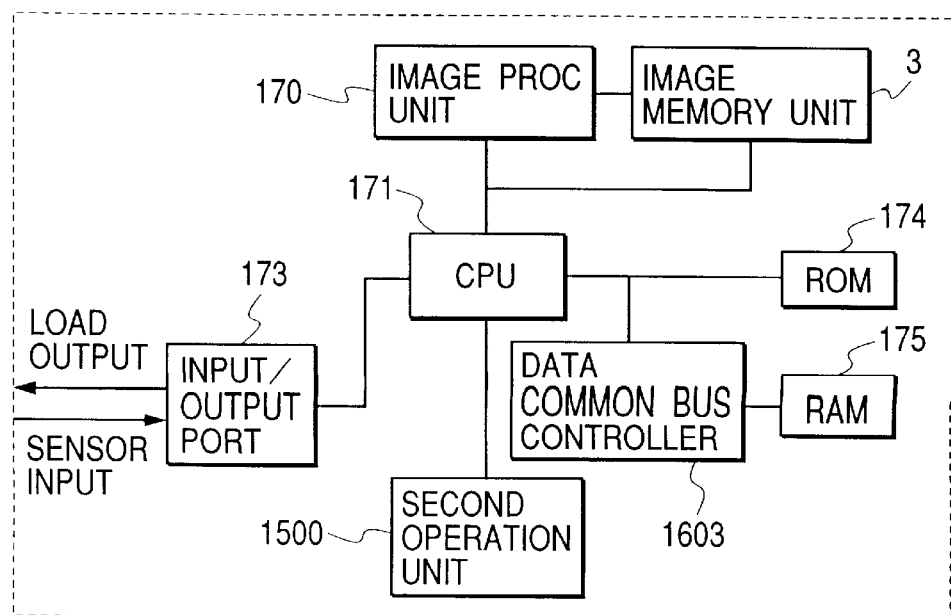
FIG. 14 is a block diagram showing a control structure of an image process apparatus according to a second embodiment of the present invention.

FIG. 14 is a block diagram for explaining a control structure of the image process apparatus according to the second embodiment of the present invention. It should be noted that, in FIG. 14, the same parts as those shown in FIG. 2 are respectively added with the same reference numerals.

In the drawing, numeral 1500 denotes a second operation unit connected to a CPU 171. Thus, the CPU 171 controls a display means and a key input means of the unit 1500. The operator instructs the CPU 171 to change or switch an image formation operation mode, displaying and the like, through key input from the unit 1500, and the CPU 171 displays a state of an image formation apparatus body 100 and operation mode setting made by the key input.

Numeral 1603 denotes a data common bus controller connected to address data buses 1604 to 1604 (later described in FIG. 16) to control them.

Since structures of an image process unit 170, an image memory unit 3, the external interface unit 4 are respectively identical with those shown in FIGS. 3, 4 and 5, explanations thereof are omitted.

Figure 15:
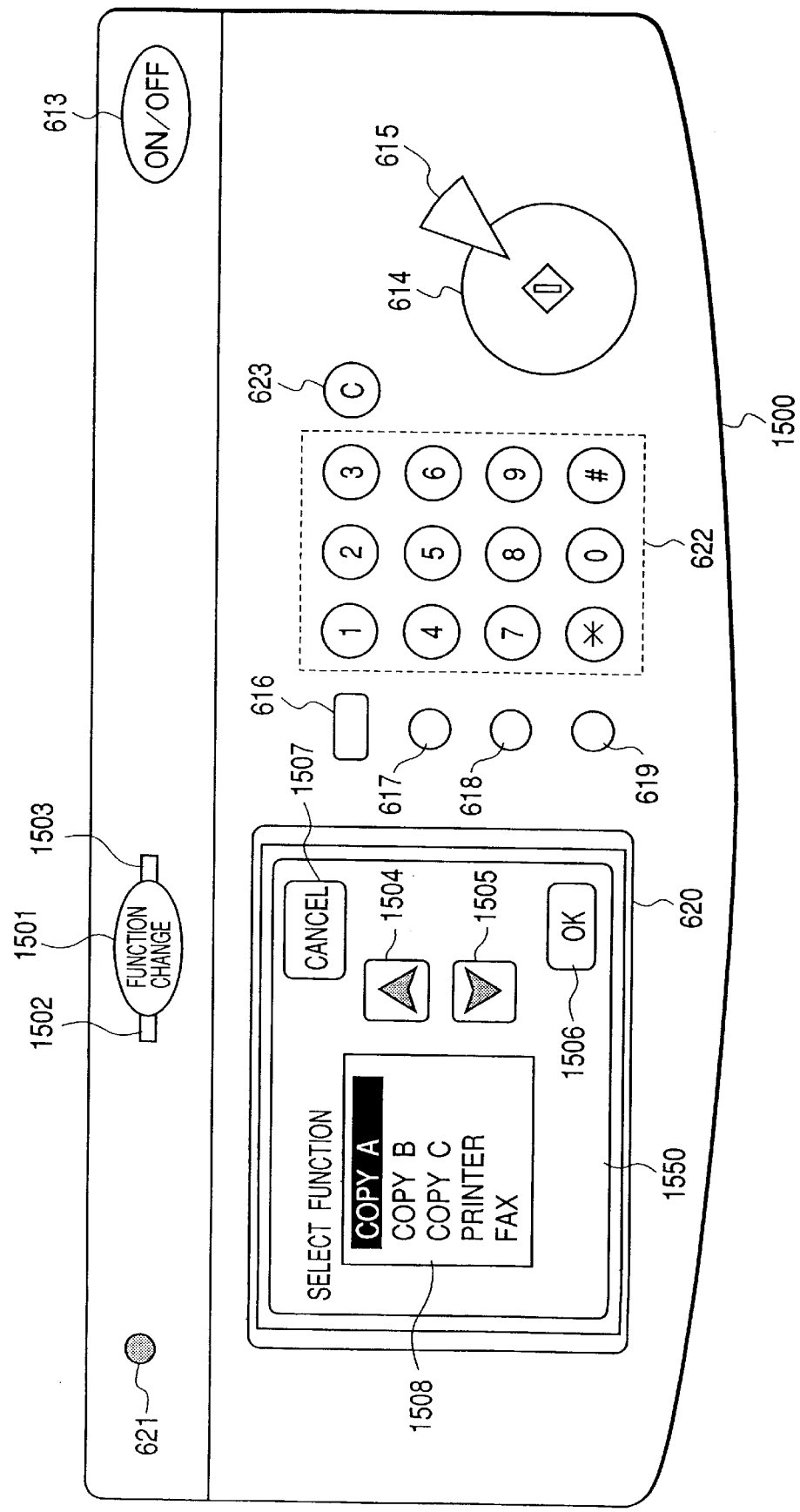
FIG. 15 is a view for explaining a layout of a second operation unit shown in FIG. 14.

FIG. 15 is a view for explaining a layout of the second operation unit 1500 shown in FIG. 14. In FIG. 15, it should be noted that the same parts as those shown in FIG. 6 are added with the same reference numerals.

As the embodiment in which the screens are changed or switched, the second embodiment will be explained hereinafter with reference to FIG. 15.

In the drawing, numeral 1500 denotes the second operation unit. Numeral 1501 denotes a function switch key capable of being depressed during any operation is being displayed. That is, when the key 1501 is depressed, a function selection screen 1550 is immediately displayed on a display panel 620.

The function selection screen 1550 is the screen used to switch or change an operation screen for each function. Numeral 1508 denotes a function selection area on which a list of the functions realized by the image formation apparatus body 100 according to the embodiment is displayed. When a function name displayed on the area 1508 of a touch panel is depressed to select the corresponding function, the selected name is reversely displayed. In the drawing, "copy A" is being selected.

Numeral 1504 and 1505 denote cursor keys used to scroll the screen when it is impossible to display all the functions of the body 100 within one screen of the function selection area 1508. In the example shown in FIG. 15, all the items can be displayed within one screen, and the cursor keys are illustrated by dots (or mesh). This means that the key depression is impossible.

Numeral 1506 denotes an OK key. When the function is selected on the function selection area 1508 and the OK key 1506 is then depressed, the current screen is switched to the setting screen for the selected function. Numeral 1507 denotes a cancel key used to cancel the switching of the setting screen. When the cancel key 1507 is depressed, the screen returns to the setting screen displayed before the key 1501 is depressed.

Numeral 1503 denotes a green LED arranged on the right of the function switch key 1501. The LED 1503 is turned on to indicate an operation state of a function other than the function currently displayed on the display panel 620 of the second operation unit 1500. For example, in a case where the copy A setting screen is being displayed, if any one of copy B, copy C, printer and facsimile functions is in an operation state, the LED 1503 is controlled to be turned on and off repeatedly. Further, in a case where images of the functions being not in the operation state have been stored in the hard disk 404 of the image memory unit 3 and all the functions are not in the operation state, the LED 1503 is controlled to be ON.

Numeral 1502 denotes a red LED on the left of the key 1501. The LED 1502 is turned on to indicate that abnormality occurs in a job of the function other than the function currently displayed on the display panel 620 of the second operation unit 1500. For example, on the copy A setting screen, when the abnormality such as paper-empty interruption, jam or the like occurs in any one of the copy B, copy C, printer and facsimile functions, the LED 1502 is controlled to be turned on and off repeatedly.

As above, when the setting screens of the respective functions are changed or switched, the function selection screen 1550 is displayed on the display panel (touch sensor display or the like) 620 such that the selection operation is performed on the screen 1550. Therefore, even if the number of functions to be realized by the image formation apparatus body 100 is increased, the setting screen can be easily changed or switched without adding any hard key or the like.

Figure 16:
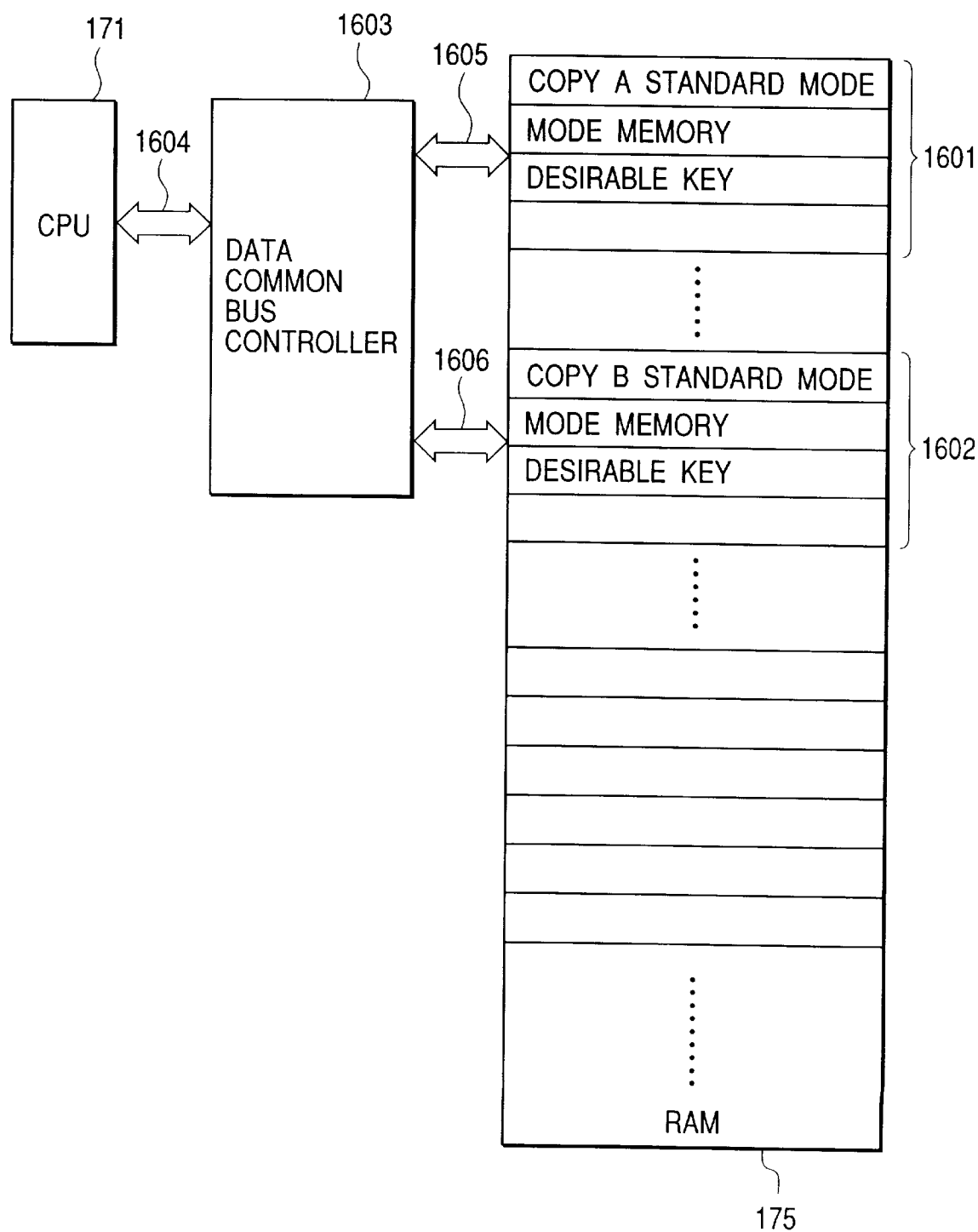
FIG. 16 is a block diagram for explaining a management structure of a RAM shown in FIG. 14.

FIG. 16 is the block diagram for explaining a management structure of a RAM 175 shown in FIG. 14. This diagram shows a case where the memory access is managed by the data common bus controller 1603. In FIG. 16, it should be noted that the same parts as those shown in FIG. 2 are added with the same reference numerals.

In the drawing, numeral 1601 denotes a user setting data area for the copy A secured in the RAM 175 of FIG. 14 and mapped in a memory space of the CPU 171. The numeral 1602 denotes a user setting data area for the copy B secured in the RAM 175 of FIG. 14 and mapped in the memory space of the CPU 171. It should be noted that these data areas may be secured in the hard disk.

Numerals 1604, 1605 and 1606 respectively denote the address data buses. The bus 1604 connects the CPU 171 and the data common bus controller 1603, the bus 1605 connects the areas 1601 and 1603, and the bus 1606 connects the areas 1602 and 1603.

Both the areas 1601 and 1602 are connected to the controller 1603 respectively by the address buses 1605 and 1606 for data writing and reading. The CPU 171 accesses the memory space thereof through the address data bus 1604.

The data common bus controller 1603 controls connection between the but 1604 and the buses 1605 and 1606.

Further, the controller 1603 judges a switch setting flag for determining whether or not the user data is common by the copy A and the copy B. In a case where it is considered that the user data is common, when the controller 1603 receives an instruction from the CPU 171 to access the address of the user setting data area 1602 for the copy B, it controls the address data buses 1604 and 1605 to be connected to each other. Thus, if the CPU 171 accesses either the user setting data area 1601 or 1602, the user setting data area 1601 is accessed.

As above, in the case where the operation setting screens are provided respectively for the copy A and the copy B, the respective screens for the copy A and the copy B are appropriately switched such that copy operation start, copy operation stop and state confirmation for the copy A and the copy B are performed on the respective screens. Therefore, the plural copy functions can be executed by the same operation as that in the first embodiment.

By applying such the structure as above, if predetermined abnormality by which the image formation should be interrupted is found in the printer unit, the screen is immediately and automatically switched to the copy mode setting screen for the copy job in which the abnormality occurs. Therefore, the abnormality can be quickly notified to the user.

Further, as the output order of the plural copy jobs registered after reading all the original images is changed, the outputting of the copy job can be performed in the higher-priority order.

Figure 17B:
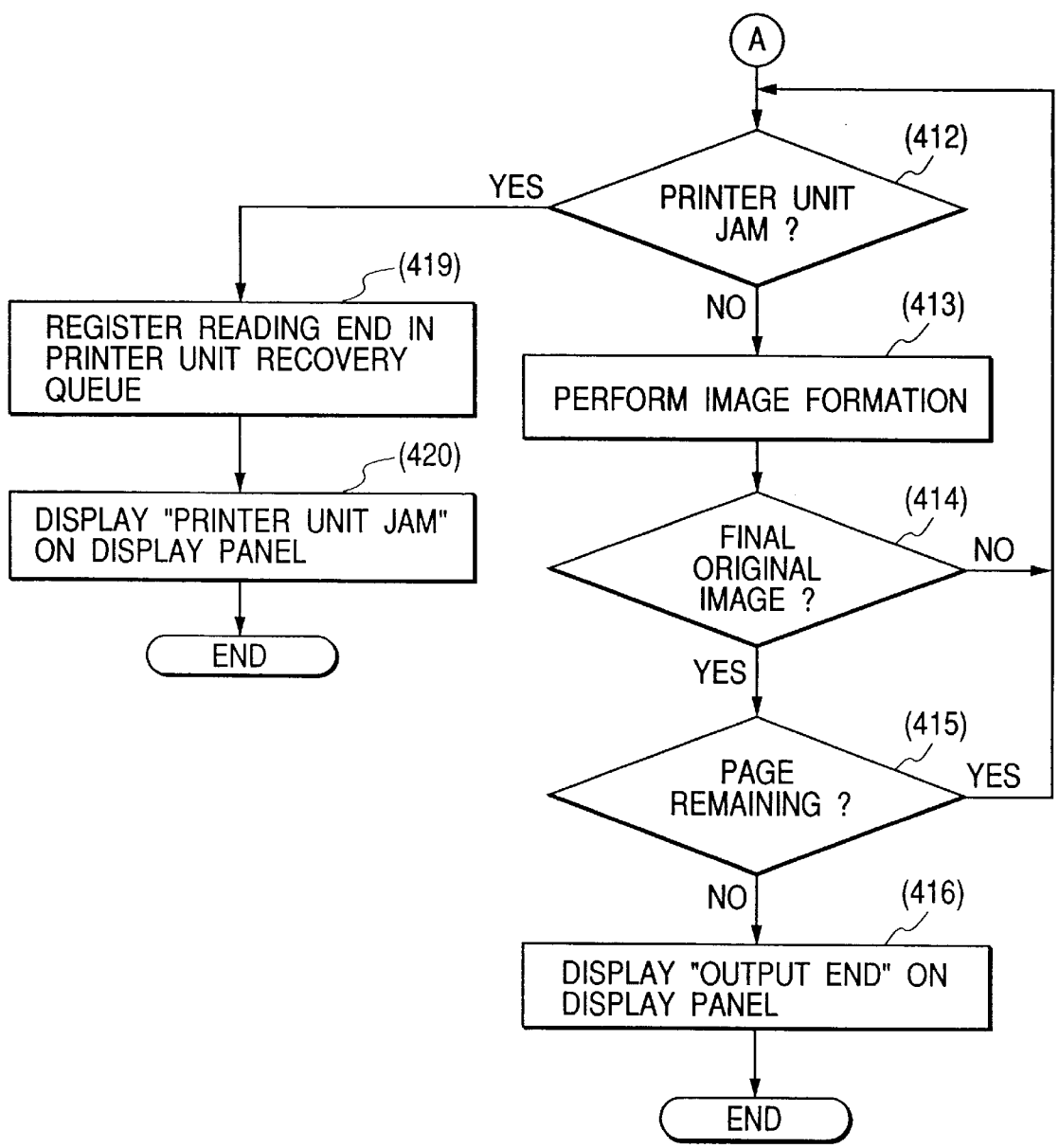
FIG. 17, composed of FIGS. 17A and 17B, is a flow chart showing an example of fifth data process procedure in the image formation apparatus according to the present invention.

FIGS. 17A and 17B are flow charts showing an example of fifth data process procedure in the image formation apparatus according to the present invention. This chart corresponds to data process procedure at a time when the image reading and the image formation operation in the copy A, B or C operation is controlled. In FIGS. 17A and 17B, it should be noted that the process shown is called by the main sequence at every constant time or according to necessity, and that numerals (401) to (420) denote respective steps.

Initially, it is judged whether or not the start key 614 is depressed (401). At this time, it is necessary that the copy A, B or C has been selected on the function selection screen 1550 displayed by depressing the function switch key 1501 of the second operation unit 1500. If judged that the key 614 is not a depressed yet, the flow returns to the step (401) to wait for key depression.

On the other hand, if judged in the step (401) that the key 614 is depressed by the operator, then it is judged whether or not the copy start is possible (402). In this case, in the case where the reading operation of the copy B or C or the copy A is being performed, or the case where the reading operation by the facsimile function is being performed, it is judged that the copy start is impossible. Moreover, in the case where the set copy operation mode is inoperable, e.g., the case where a set paper feed cassette contains no paper, or the case where the copy operation is designated with a paper size incapable of being managed by the paper discharge process unit, it is also judged that the copy start is impossible.

If judged in the step (402) that the copy start is impossible, the flow returns to the step (401). At this time, the state that the copy start is impossible may be displayed on the display panel 620 of the second operation unit 1500.

On the other hand, if judged in the step (402) that the copy start is possible, then it is judged whether or not abnormality such as jam or the like occurs in the printer unit 2 due to the print output operation in the job of the other function (403). If judged that the abnormality occurs, occurrence of abnormality such as the jam or the like in the printer unit 2 is displayed on the panel 620 of the unit 1500 for the copy A, B or C job, and then the process terminates (417).

On the other hand, if judged in the step (403) that any abnormality does not occur in the printer unit 2, the state that the reader unit 1 is in the original reading operation is displayed on the display panel 620 of the unit 1500 (404). Then, the original is fed onto the platen glass 101 by the DF 180, and the original mounted on the glass 101 is scanned to read the original image (405). After then, the image is subjected to zooming or the like by the above image process unit 170 and the processed image is then written into the page memory 401 of the image memory unit 3 according to the mode set by the unit 1500. At this time, when the abnormality occurs in the original feeding by the DF 180, the reading process is not performed and the process in the step (405) terminates.

At this time, the image from the unit 3 is stored in the hard disk 404 through the LZ compression unit 403. After then, the original on the platen glass 101 is discharged. In this case, the images stored in the hard disk 404 are added with numbers in the image reading order for convenience in management. In this management, the information for managing the number of originals is added with "i".

Subsequently, it is judged whether or not the feeding abnormality occurs in the DF 180 (406). If judged that the abnormality occurs, it is displayed on the display panel 620 of the unit 1500 of the copy A, B or C that the original feeding state of the DF 180 is abnormal (418), and the process terminates. At this time, in a case where the image reading is performed as the original is fed by the DF 180, it can not be assured that the original finally read was normally fed and the image data of such the original has been read as a whole. Therefore, the above management information is returned to "0", the image data in the hard disk 404 is deleted, and then the process terminates.

On the other hand, if judged in the step (406) that any abnormality does not occur, then it is judged whether or not the original of which reading has terminated immediately before such the judgment is the final image (407). If judged that such the original is not the final image, the flow returns to the step (405) to feed the next original. This operation is repeated until all the originals are processed.

In the meantime, if judged in the step (407) that such the original is the final image, the copy A, B or C job is registered in the print output queue to control the print output order (408). In this case, the job is registered in the queue according to information concerning the priority previously determined for each function. For example, the output queue is searched from its end to find the function of the already registered job of which priority is equal to or higher than that of the job currently registered, and such the currently registered job is set after the found job in the output queue.

By doing so, the respective jobs are registered from the top of the queue in the order to be processed. Thus, if the priority of the function of the currently registered job is higher than those of the already registered jobs in the queue, the currently registered job is processed before the already registered jobs are processed.

Subsequently, the display panel 620 of the second operation unit 1500 of the copy A, B or C displays print output wait (409). It is controlled that such a message is displayed on the operation display area 632 within the setting screen of the panel 620.

Subsequently, the output order checking subroutine based on the flow chart of FIG. 13 is called, and it is judged whether or not the order of next print output in the print output queue is the copy A, B or C (410). If judged that the order is not the copy A, B or C, the flow returns to the step (410). On the other hand, if judged that the order is the copy A, B or C, the display panel 620 of the second operation unit 1500 of the copy A, B or C displays that the copy A, B or C job is in print outputting (411).

Then, it is judged whether or not the abnormality such as jam, paper empty or the like occurs in the printer unit 2 (412). At this time, the abnormality in the unit 2 occurred before the print operation of the copy A, B or C starts is also checked. Such the abnormality to be checked is the abnormality due to the print operation of the other job by which the print operation is interrupted.

If judged in the step (412) that any abnormality does not occur, the current job is registered in a recovery queue to restart the printer output (419). It should be noted that, in the recovery queue, the job is processed in the order registered. After then, the display panel 620 displays the abnormality in the printer unit 2 (420), and the process terminates.

On the other hand, if judged in the step (412) that any abnormality does not occur in the printer unit 2, the image is read from the hard disk 404 of the image memory unit 3 in the image formation order, the read image is subjected to an edit process according to the image formation mode set at the second operation unit 1500, and the processed image is then expanded in the page memory 401. At this time, if the setting mode is the layout mode or the like, the plural original images are read, and the read images are subjected to layout on the memory 401 and then expanded.

After then, the image is outputted to the printer unit 2. In the unit 2, according to the above image formation operation, the transfer paper is fed from the cassette, the image is formed on the fed paper in synchronism with the image sent from the image memory unit 3, and the obtained paper is discharged outside the apparatus (413).

Subsequently, it is judged whether or not the image obtained in the image formation is the image of the final original (414). If judged that the obtained image is not the image of the final original, the flow returns to the step (412). On the other hand, if judged that the obtained image is the image of the final original, then it is judged whether or not the image formation corresponding to the number of copies set by the second operation unit 1500 has wholly completed (415). If judged that the image formation does not terminate yet, the flow return to the step (412).

On the other hand, if judged in the step (415) that the image formation has completed, the display panel 620 of the second operation unit 1500 displays that the print output of the copy A, B or C terminates (416), and then the copy image formation operation terminates.

As above, according to the second embodiment, since the image formation operation starts after all the original images were read, the image formation operation is not interrupted due to the abnormality such as jam or the like in the DF 180. Therefore, even if the abnormality such as the jam or the like occurs in the DF 180 when the original image is read, it is unnecessary for the print output of the other function to wait for the operation for eliminating such the abnormality.

For this reason, in the case where the abnormality is detected in the image process of any one of the registered copy jobs, if such the job occurred in the image formation unit and thus it is necessary to interrupt the image process, the screen can be promptly switched or changed to the setting screen for the copy job in which the abnormality was found. Therefore, it is possible to quickly issue to the user an instruction for eliminating damage in the apparatus due to the abnormality, and it is also possible to shorten a standby time until the next image process can start.

Third Embodiment

Subsequently, a display control operation performed on an operation screen when abnormality occurs in copy A, B or C job will be explained.

It should be noted that, in the third embodiment, the operation unit (FIG. 6) in the first embodiment is used.

Hereinafter, an example of a control flow chart in case of performing image reading and image formation in composite copy A and B operations will be explained with reference to FIGS. 18 to 22.

Figure 18:
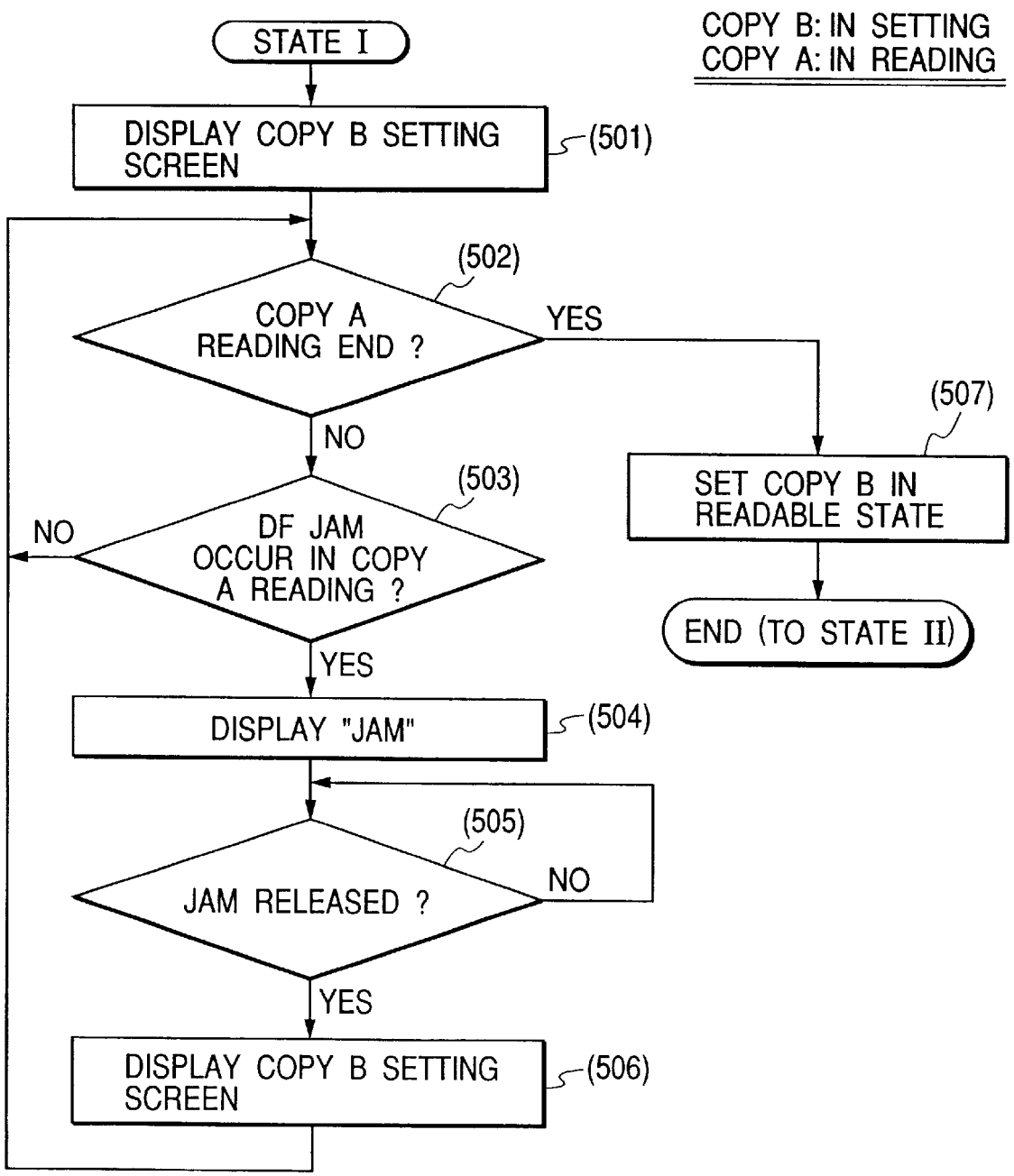
FIG. 18 is a flow chart showing an example of sixth data process procedure in the image formation apparatus according to the present invention.

FIG. 18 is the flow chart showing the control procedure and the screen display timing while the copy A is in the image reading and the copy B is in the copy mode setting (state I). This procedure is executed when the copy B is being selected by the switch key 604.

Figure 23:
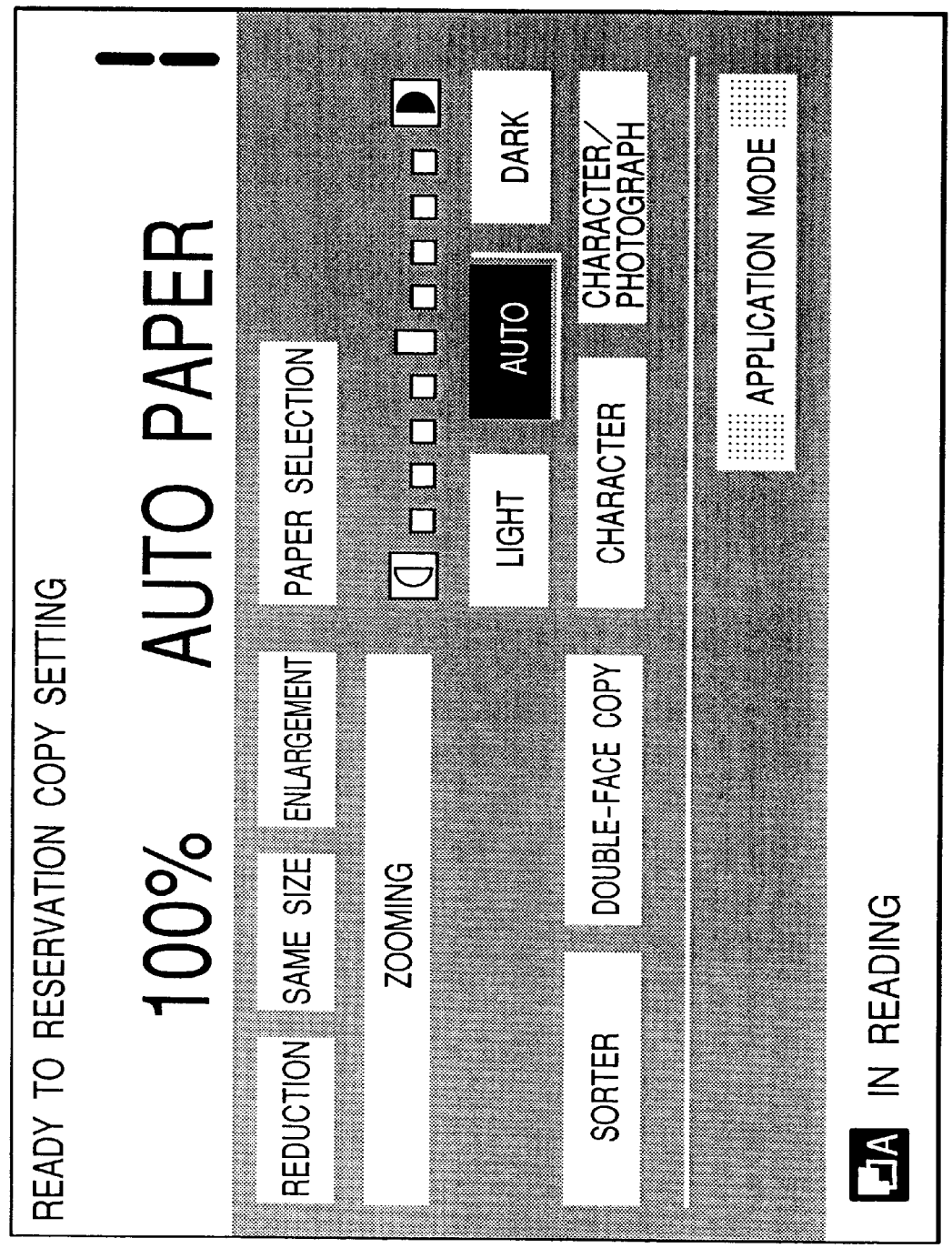
FIG. 23 is a view showing a copy B setting screen at the time of copy A image reading and copy B mode setting.

Initially, a copy B setting screen as shown in FIG. 23 is displayed (501). This setting screen is a standard screen which has been previously registered by the user or a screen which displays the copy mode set prior to such registration. When the key input is performed at the operation unit, the screen is updated to reflect the operation.

Figure 24:
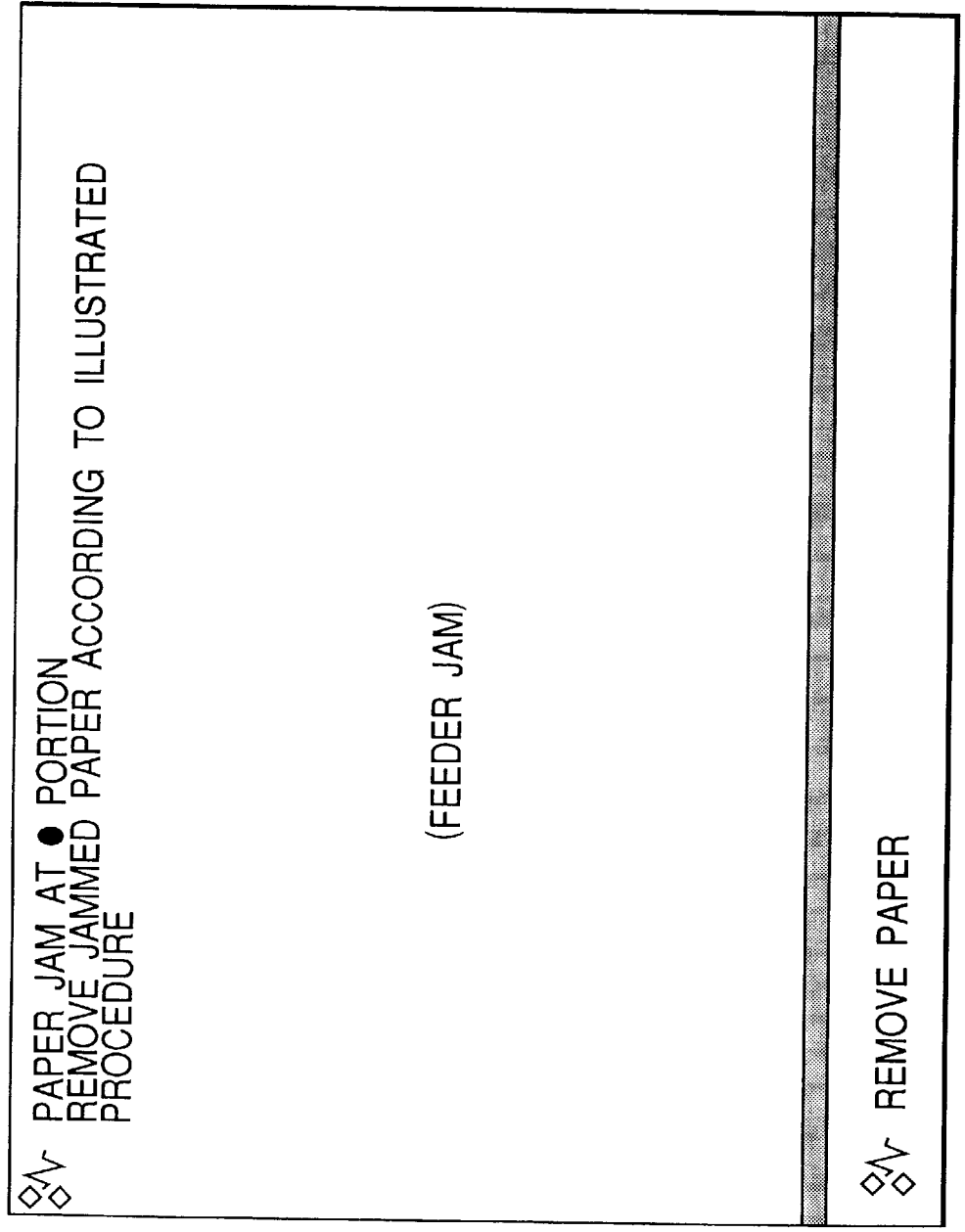
FIG. 24 is a view showing the copy B setting screen at the time of copy A feeder jam and copy B mode setting.

Then, the flow advances to a step (502) to judge whether or not the image reading for the copy A terminates. If judged that the image reading does not terminate, then it is judged whether or not DF jam occurs during the image reading for the copy A (503). If judged in the step (503) that the DF jam occurs in the copy A job, it is impossible to start the image reading for the copy B unless the jam is not released. Therefore, the DF jam is immediately displayed on a screen as shown in FIG. 24 instead of the copy B setting screen (504), and the process waits for release from jam (505). If a jam process terminates and thus the jam is released in the step (505), the copy B setting screen displayed before the jam occurs is displayed (506). After the screen was displayed, the flow returns to the step (502). Then, the processes in the steps (502) to (506) are repeated until the image reading for the copy A terminates. Also, if judged in the step (503) that any DF jam does not occur, the flow returns to the step (502).

If the switch key 601 is depressed while the jam screen is being displayed, the screen identical with that shown in FIG. 23 is displayed. After the jam was released, the copy A screen is displayed.

If judged in the step (502) that the image reading for the copy A terminates, the flow advances to a step (507) to shift the copy B job to be in a readable state, and the process terminates. After the state was shifted, the copy A job is in the printing and the copy B job is in the copy mode setting (state II).

Figure 19:
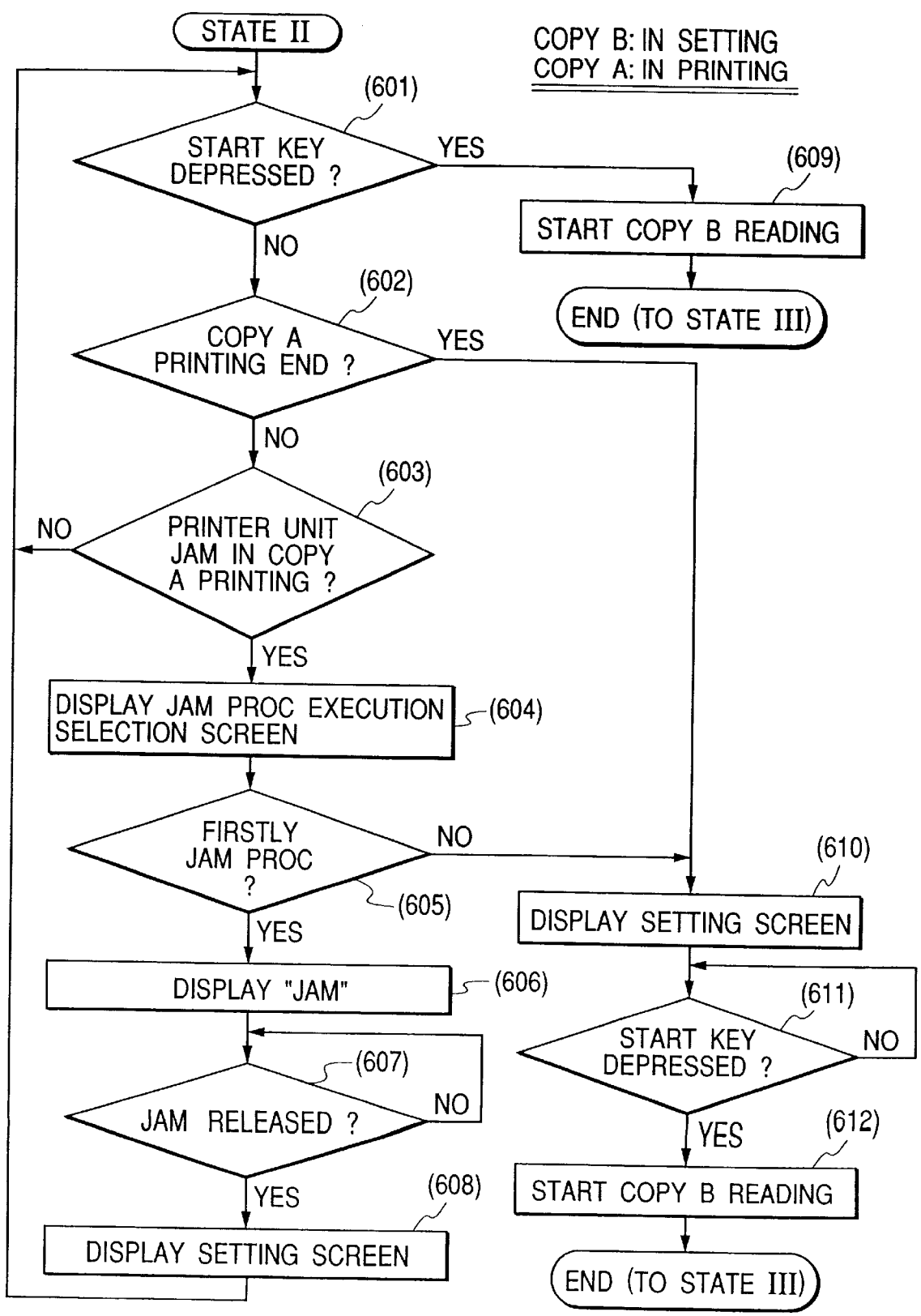
FIG. 19 is a flow chart showing an example of seventh data process procedure in the image formation apparatus according to the present invention.

FIG. 19 is the flow chart showing control procedure and screen display timing in the copy B job while the copy A is in the printing and the copy B is in the copy mode setting (state II). This procedure starts on the termination of the image reading for the copy A in the state I.

Figure 25:
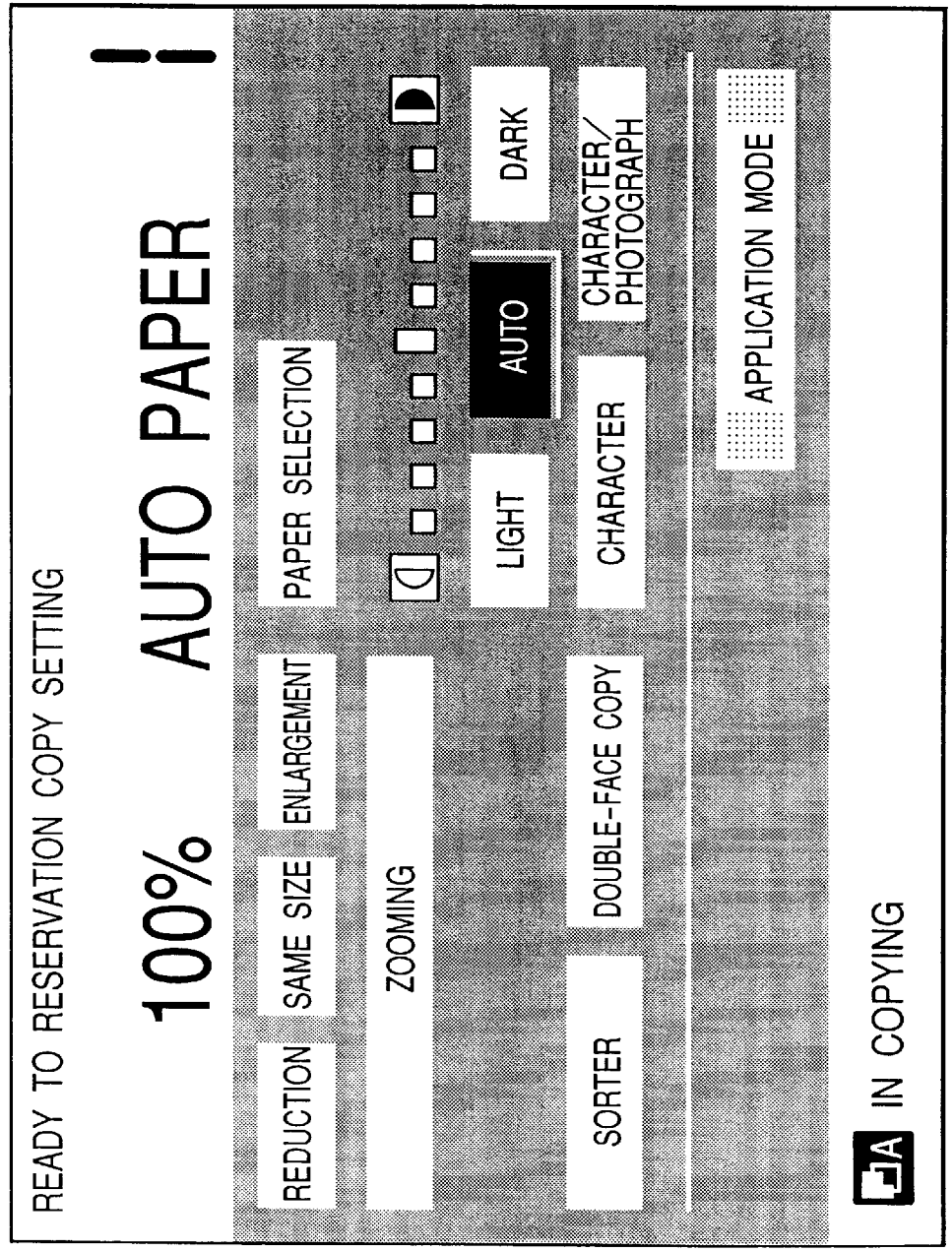
FIG. 25 is a view showing the copy B setting screen at the time of copy A printing and copy B mode setting.

The screen is changed to a copy B setting screen as shown in FIG. 25 according as, in the copy A job, the image reading state is shifted to the print state.

Figure 26:
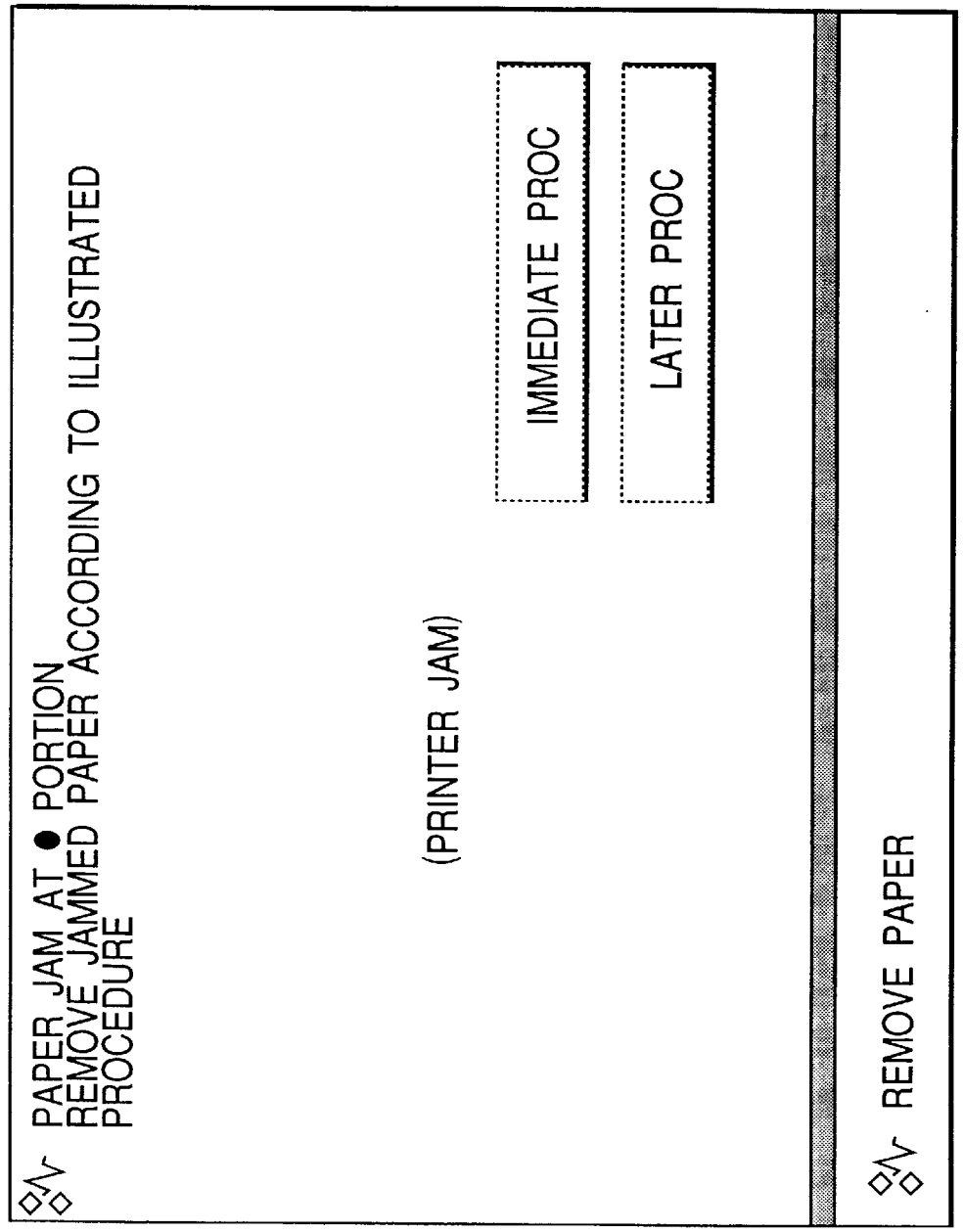
FIG. 26 is a view showing the copy B setting screen at the time of copy A print jam and copy B mode setting.

Initially, it is judged whether or not the start key is depressed (601). At the same time, other key inputs are also accepted, and the copy mode setting for the copy B can be performed subsequent to the state I. If judged in the step (601) that the key is not depressed, the flow advances to a step (602) to judge whether or not the copy A printing terminates. If judged that the printing does not terminate, then it is judged whether or not printer jam occurs in the copy A printing (603). If judged in the step (603) that the printer jam occurs, a jam process execution selection screen as shown in FIG. 26 is displayed (604). In this printer jam, since the processes up to the image reading process can be performed in the copy B job even if the jam is not released, it is possible for the user to select whether the jam process is to be performed before the copy B image reading starts. Therefore, such a selected result is checked (605). If checked in the step (605) that the jam process being prior to the copy B image reading is selected, a jam screen as shown in FIG. 27 is displayed (606), and the process waits for release from jam (607). If the jam process terminates and thus the jam is released in the step (607), the setting screen displayed before the jam occurs is displayed (608). After the setting screen was displayed, the flow returns to the step (601). Then, the processes in the steps (601) to (608) are repeated until the start key is depressed or the copy A printing terminates.

Also, if judged in the step (603) that any printer jam does not occur, the flow returns to the step (601).

Figure 28:
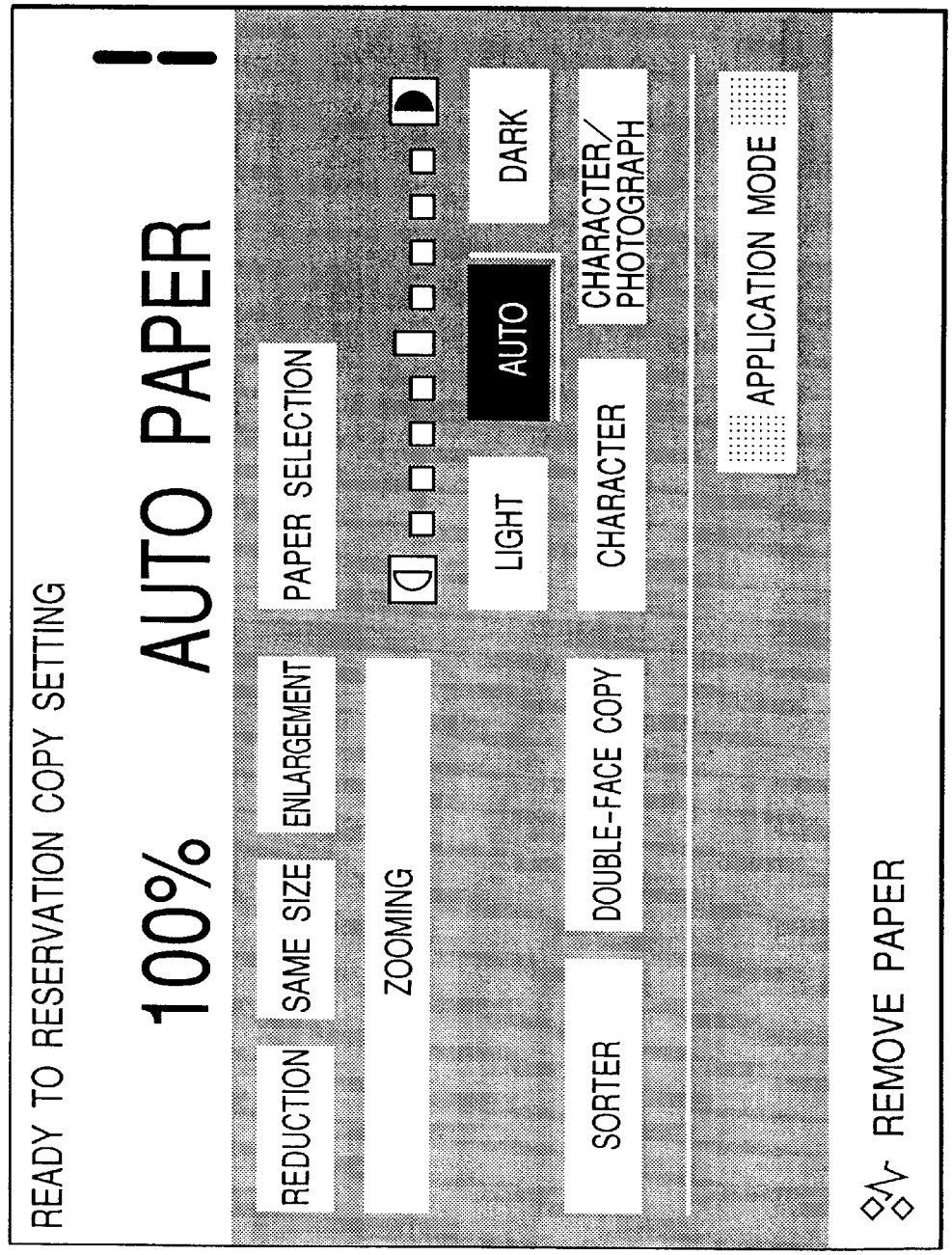
FIG. 28 is a view showing the copy B setting screen at the time of copy A print jam and copy B mode setting.

If it is selected in the step (605) that the jam process is to be performed after the copy B image reading started, the flow advances to a step (610) to display a copy B setting screen as shown in FIG. 28. Then, the process waits for the instruction issued by depressing the start key to start the copy B image reading (611). If the start key is depressed in the step (611), the copy B reading is started (612).

Also, if judged in the step (602) that the copy A printing terminates, the flow advances to the step (611) to wait for the copy B reading start instruction. In this case, if the reading for a job next to the copy A job is subsequently started, it may be set that the copy B reading start is impossible and the process waits for the termination of the copy A image reading (state I).

If the start key is depressed in the step (601), the copy B reading starts, and then the process terminates (609). After the state was shifted, the copy A job is in the printing (on standby) and the copy B job is in the image reading (state III).

Figure 20:
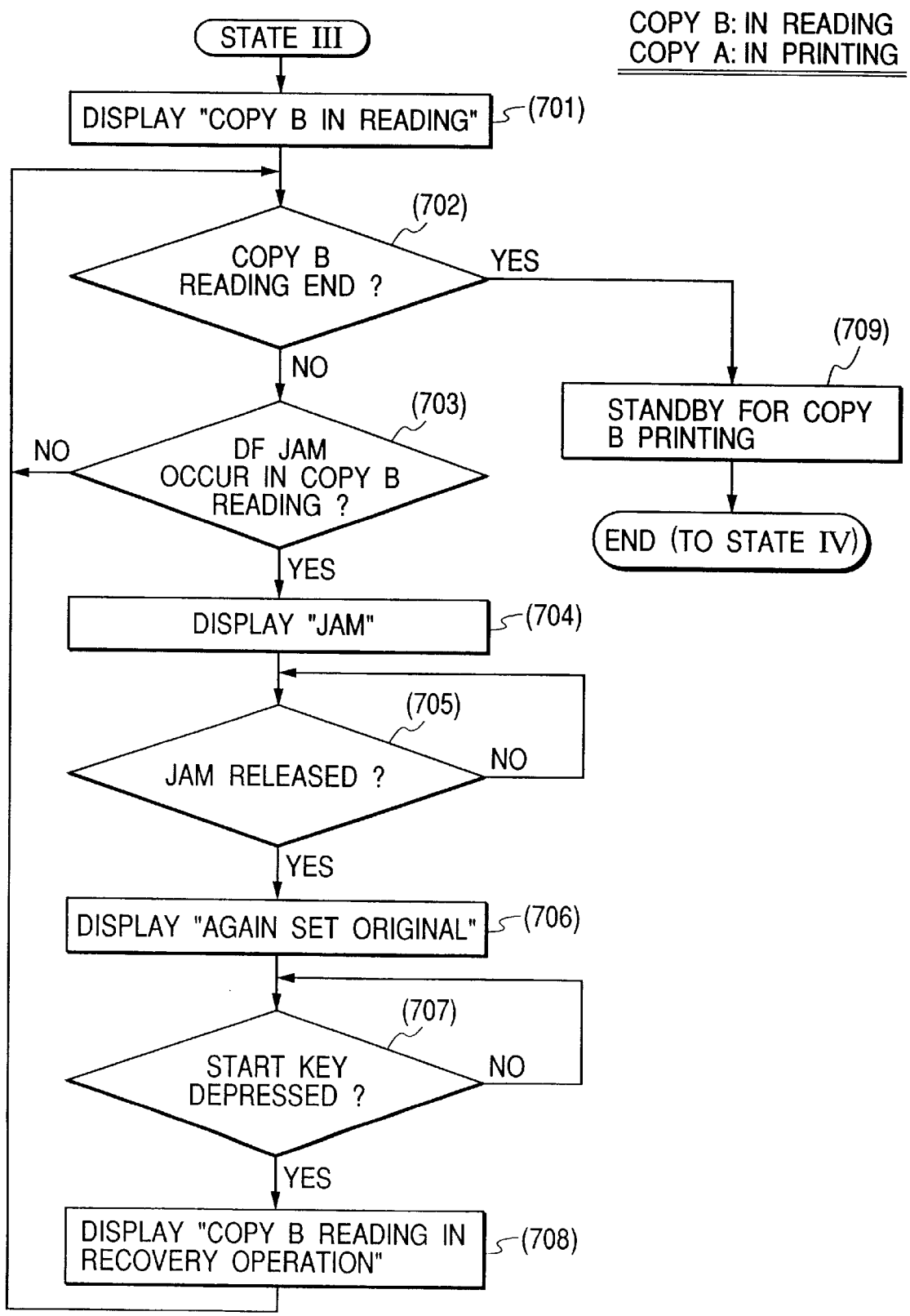
FIG. 20 is a flow chart showing an example of eighth data process procedure in the image formation apparatus according to the present invention.

FIG. 20 is the flow chart showing control procedure and screen display timing in the copy B job while the copy A is in the printing and the copy B is in the image reading (state III). This procedure starts on the copy B image reading start in the state II.

Figure 29:
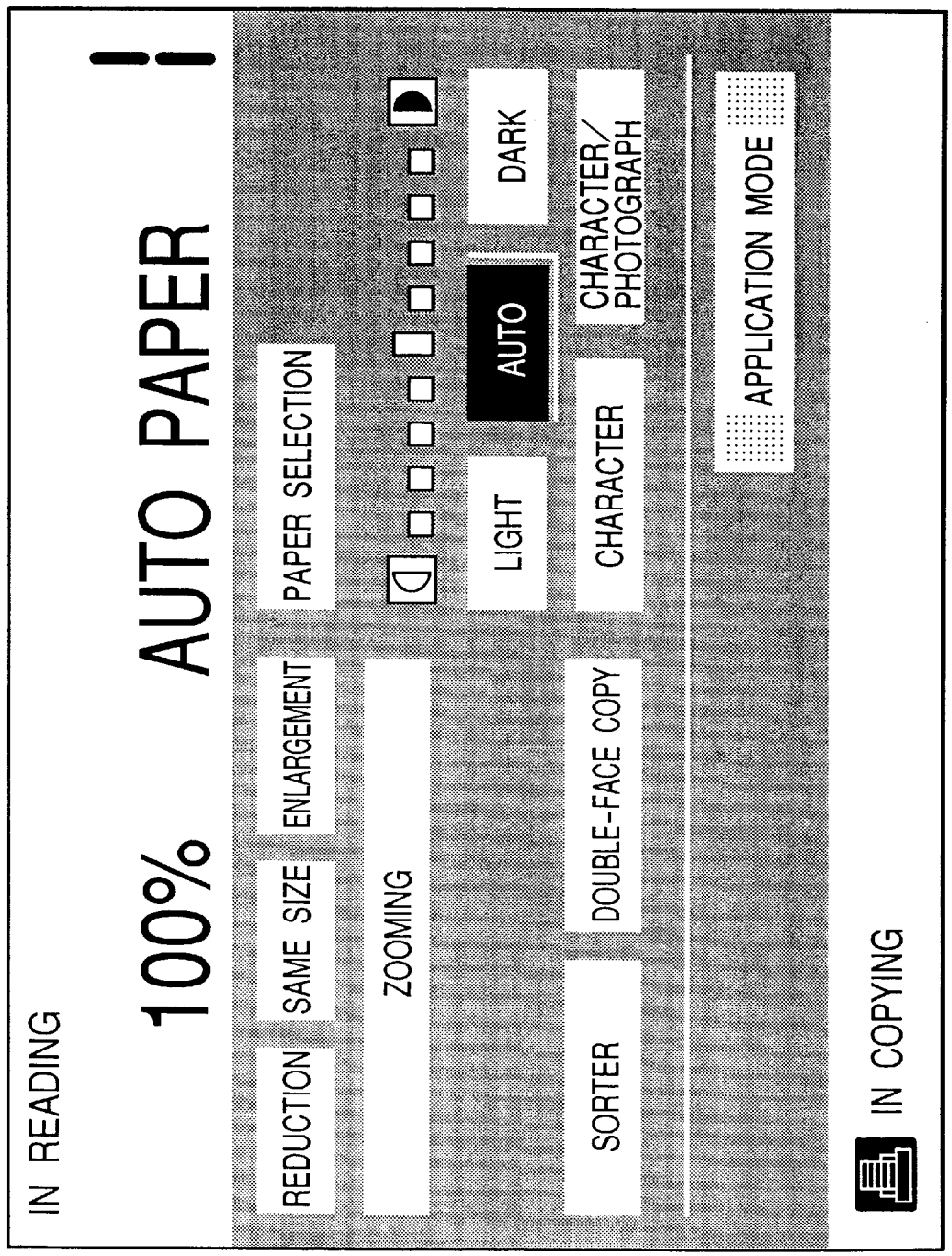
FIG. 29 is a view showing the copy B setting screen at the time of copy A printing and copy B image reading.

Initially, a copy B reading screen as shown in FIG. 29 representing that the copy B is in the reading is displayed (701), and the flow advances to a step (702) to judge whether or not the copy B image reading terminates. If judged that the reading does not terminate, then it is judged whether the DF jam occurs in the copy B image reading (703). If judged in the step (703) that the DF jam occurs, such the DF jam is displayed on the screen as shown in FIG. 24 (704), and the process waits for release from jam (705). If the jam process terminates and thus the jam is released in the step (705), an original reset screen (not shown) is displayed to restart the copy B image reading (706), and the process waits for start key depression (707). If the start key is depressed in the step (707), the copy B image reading is restarted (i.e., recovery operation), and the screen displays that the image is being read in the copy B job (708). After such displaying, the flow returns to the step (702), and then the processes from the steps (702) to (708) are repeated until the copy B image reading terminates. Also, if judged in the step (703) that any DF jam does not occur, the flow returns to the step (702).

If judged in the step (702) that the copy B image reading terminates, the flow advances to a step (709) to shift the copy B job to be on print standby, and the process terminates. After the state was shifted, the copy A job is in the printing (on standby) and the copy B job is on print standby (state IV).

Figure 30:
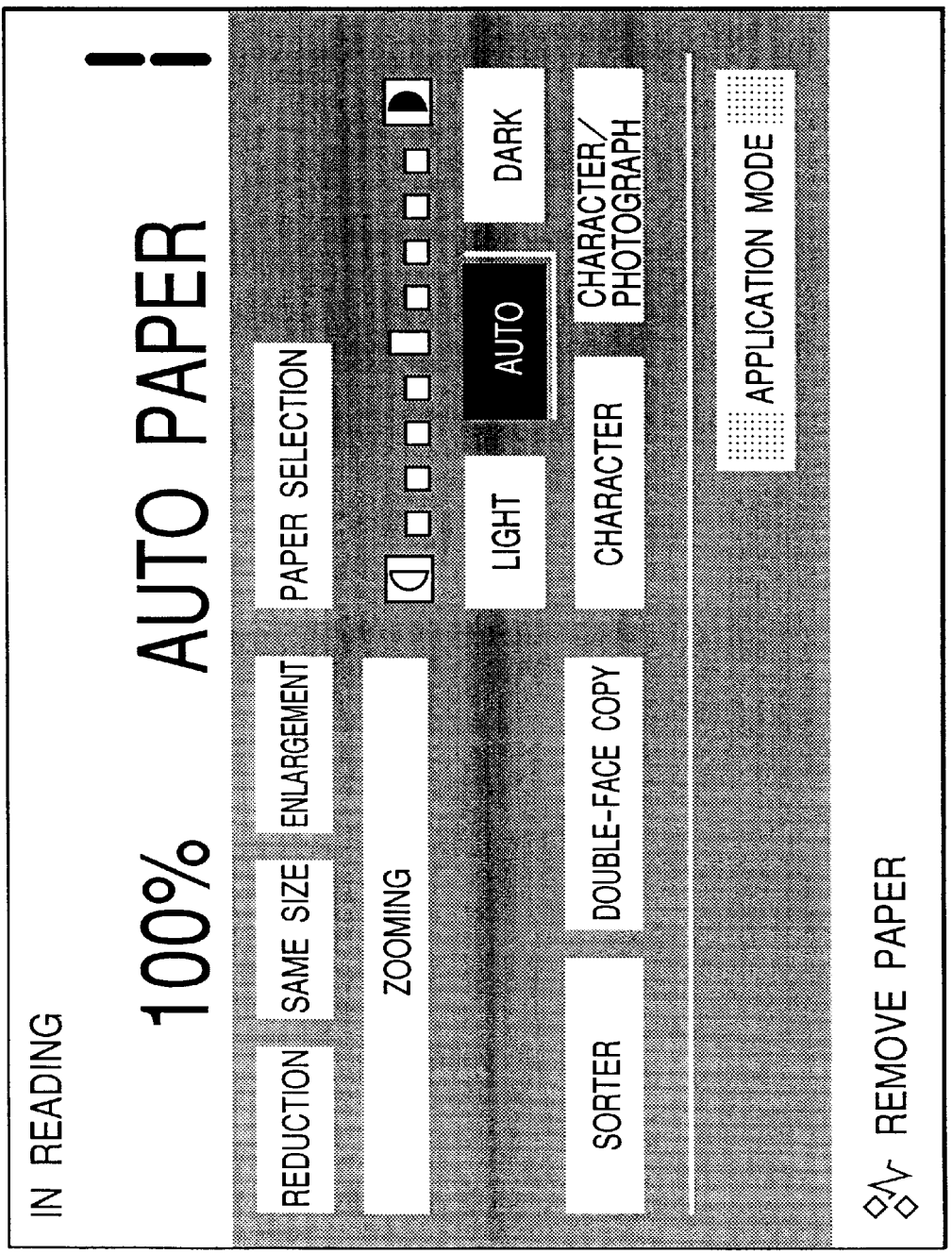
FIG. 30 is a view showing the copy B setting screen at the time of copy A printer jam and copy B image reading.

During the copy B reading in the state III, it is not judged whether or not the printer jam occurs in the copy A job, to prevent operator's confusion. Thus, the operator does not confuse the printer jam in the copy A printing and the DF jam in the copy B image reading. As the other method to prevent such confusion, it may apply a method not to perform the jam display but display on the operation display area 632 shown in FIG. 6 that the printer jam occurs in the copy A job as shown in FIG. 30.

Figure 21:
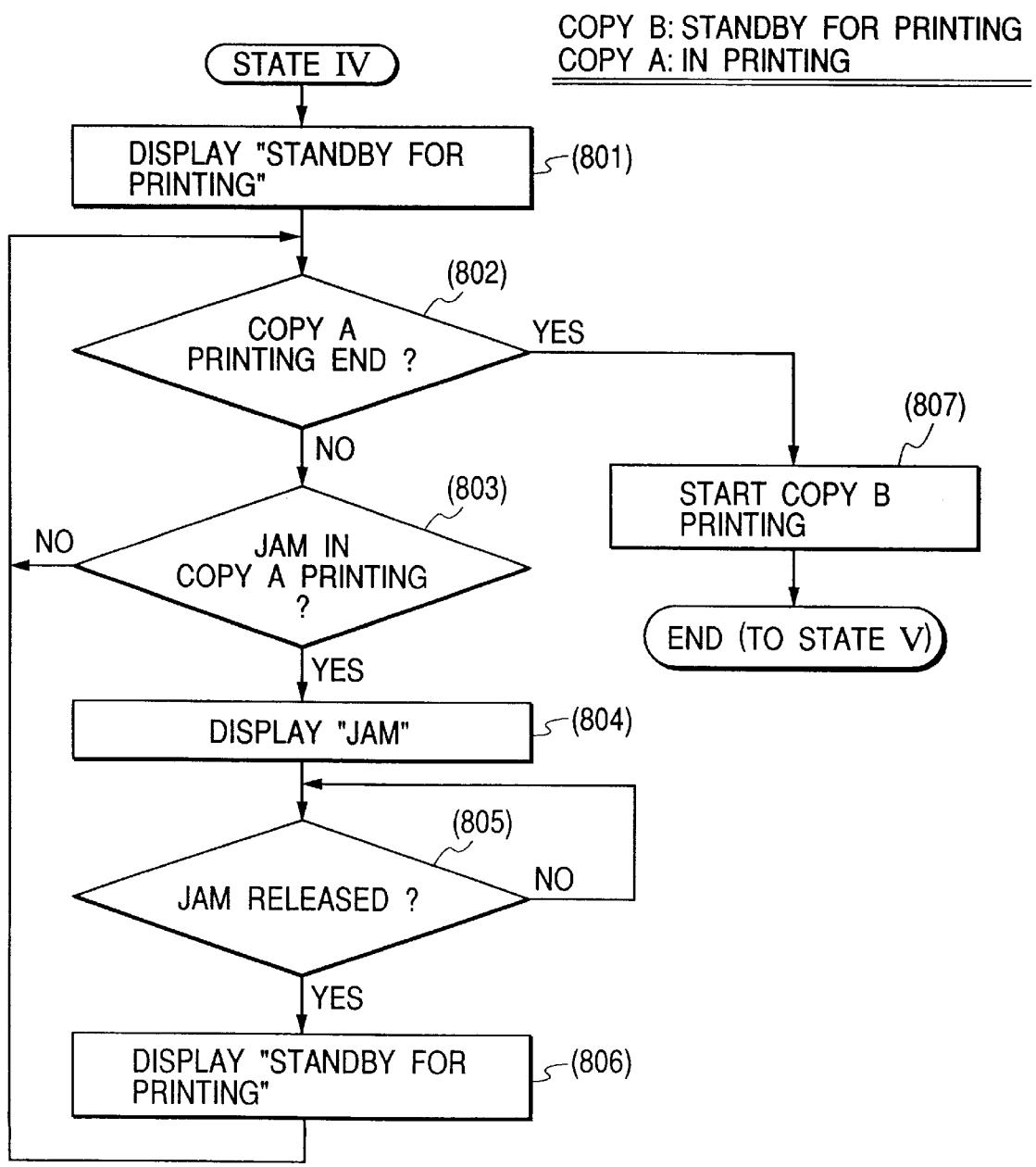
FIG. 21 is a flow chart showing an example of ninth data process procedure in the image formation apparatus according to the present invention.

FIG. 21 is the flow chart showing control procedure and screen display timing in the copy B job while the copy A is in the printing (on standby) and the copy B is on print standby (state IV). This procedure starts on termination of the copy B image reading in the state III.

Figure 31:
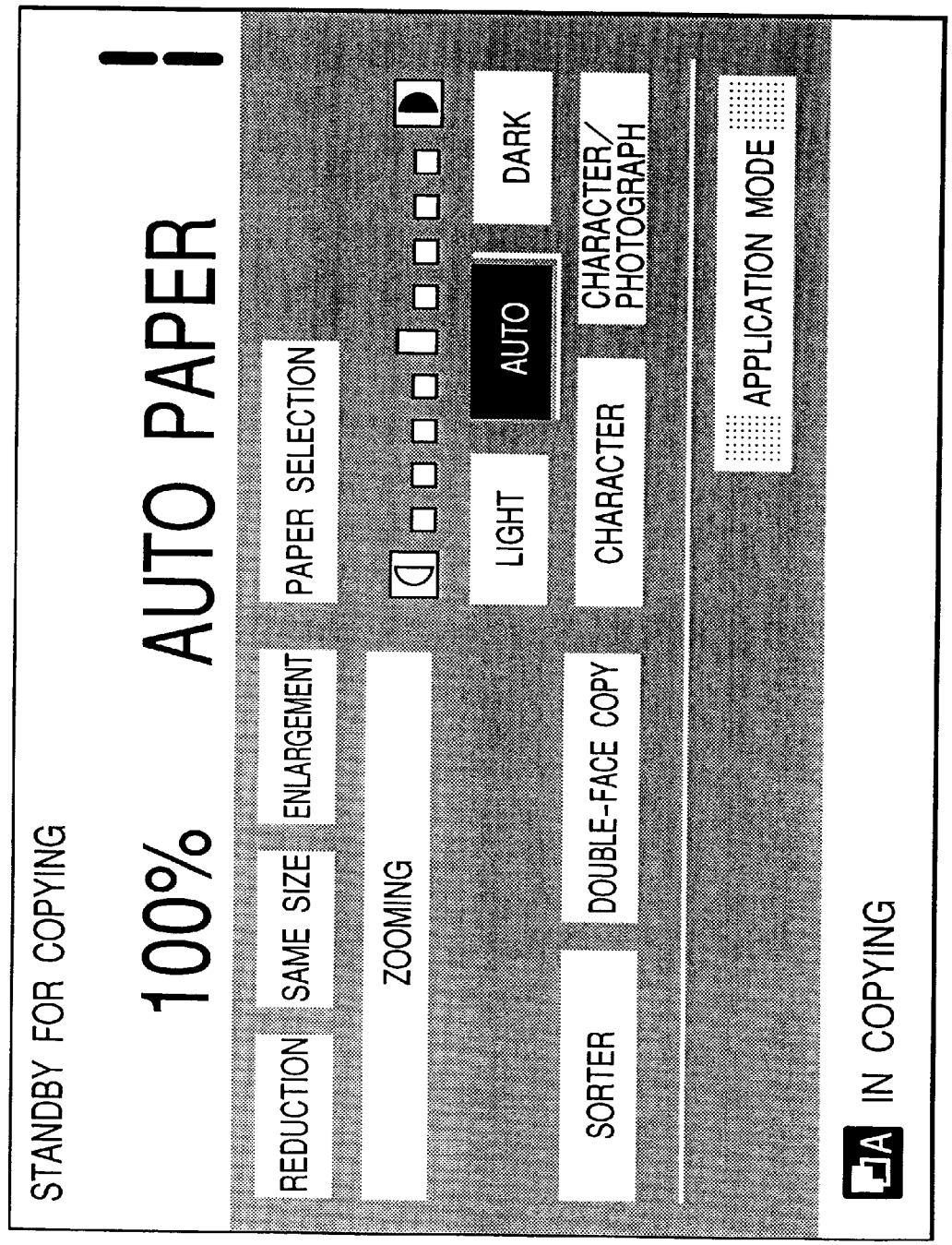
FIG. 31 is a view showing the copy B setting screen at the time of copy A printing and after copy B image reading end.

Initially, a copy B print standby screen is displayed as shown in FIG. 31 (801), and the flow advances to a step (802) to judge whether or not the copy A printing terminates. If judged that the printing does not terminate, then it is judged whether or not the printer jam occurs during the copy A printing (803). If judged in the step (803) that the jam occurs, it is impossible to start the copy B print operation unless the jam is released. Therefore, the printer jam is displayed on the screen as shown in FIG. 27 (804), and the process waits for release from jam (805). If the jam process terminates and thus the jam is released in the step (805), the copy B print standby screen is again displayed (806). After the pint standby screen was displayed, the flow returns to the step (802), and then the processes from the steps (802) to (806) are repeated until the copy A printing terminates. Also, if judged in the step (803) that any printer jam does not occur, the flow returns to the step (802).

If judged in the step (802) that the copy A printing terminates, the flow advances to a step (807) to start the copy B printing, and then the process terminates. After the state was shifted, the copy A job is on standby (capable of starting next-job reading) and the copy B job is in the printing (state V).

Figure 22:
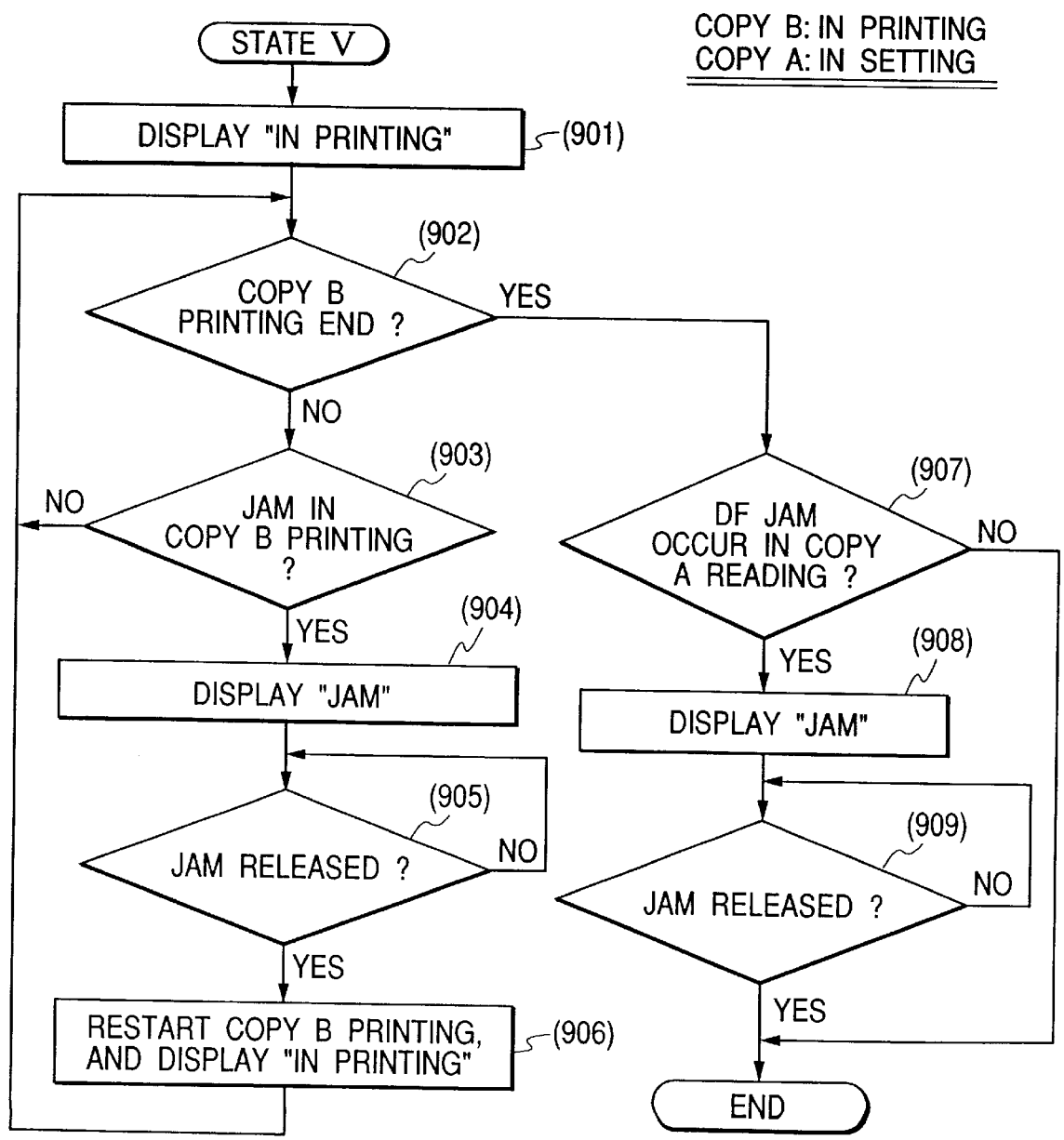
FIG. 22 is a flow chart showing an example of tenth data process procedure in the image formation apparatus according to the present invention.

FIG. 22 is the flow chart showing control procedure and screen display timing in the copy B job while the copy A is on standby (capable of starting next-job reading) and the copy B is in the printing (state V). This procedure starts according to the copy B printing start in the state IV.

Figure 32:
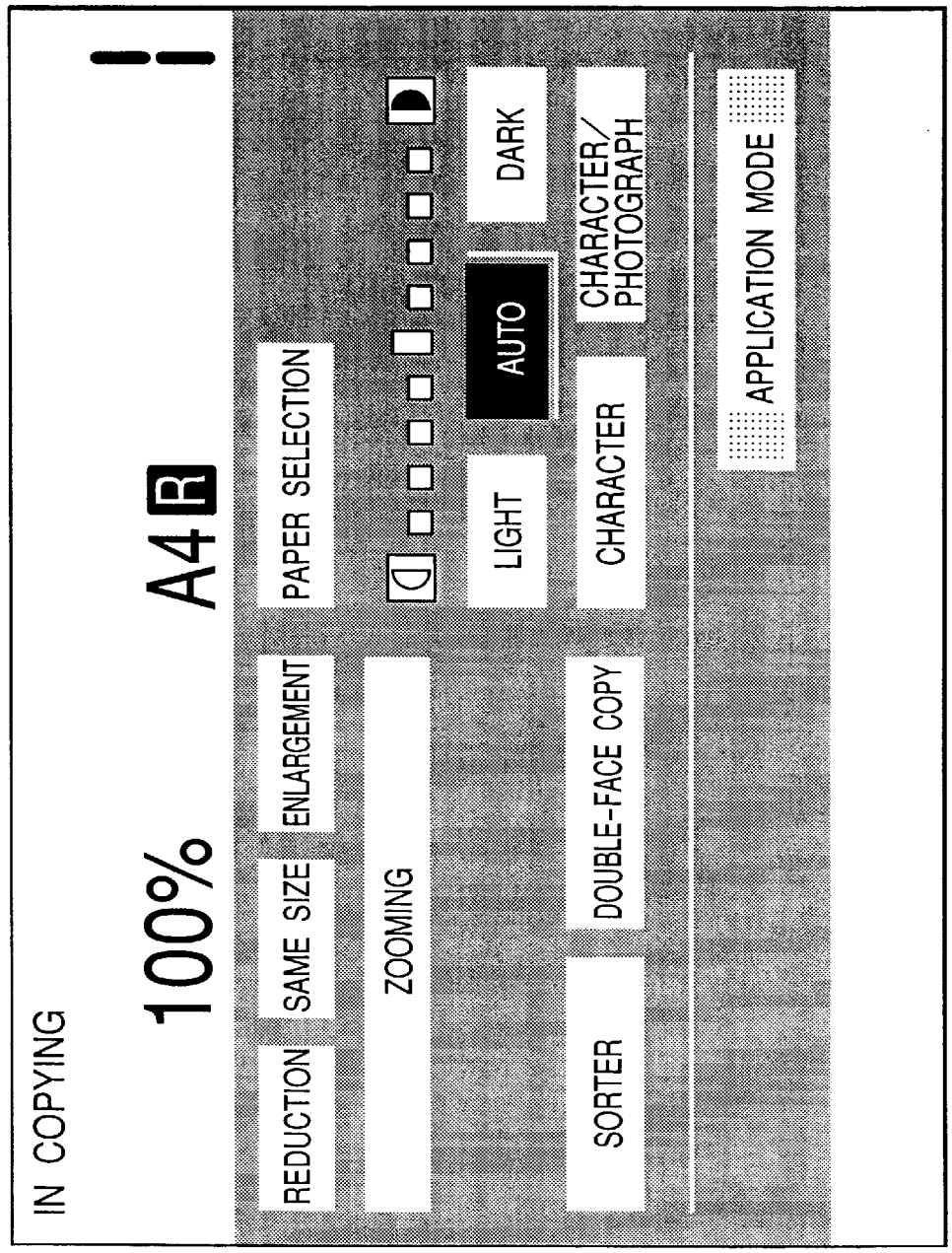
FIG. 32 is a view showing the copy B setting screen after copy A printing end and at the time of copy B printing.
Figure 33:
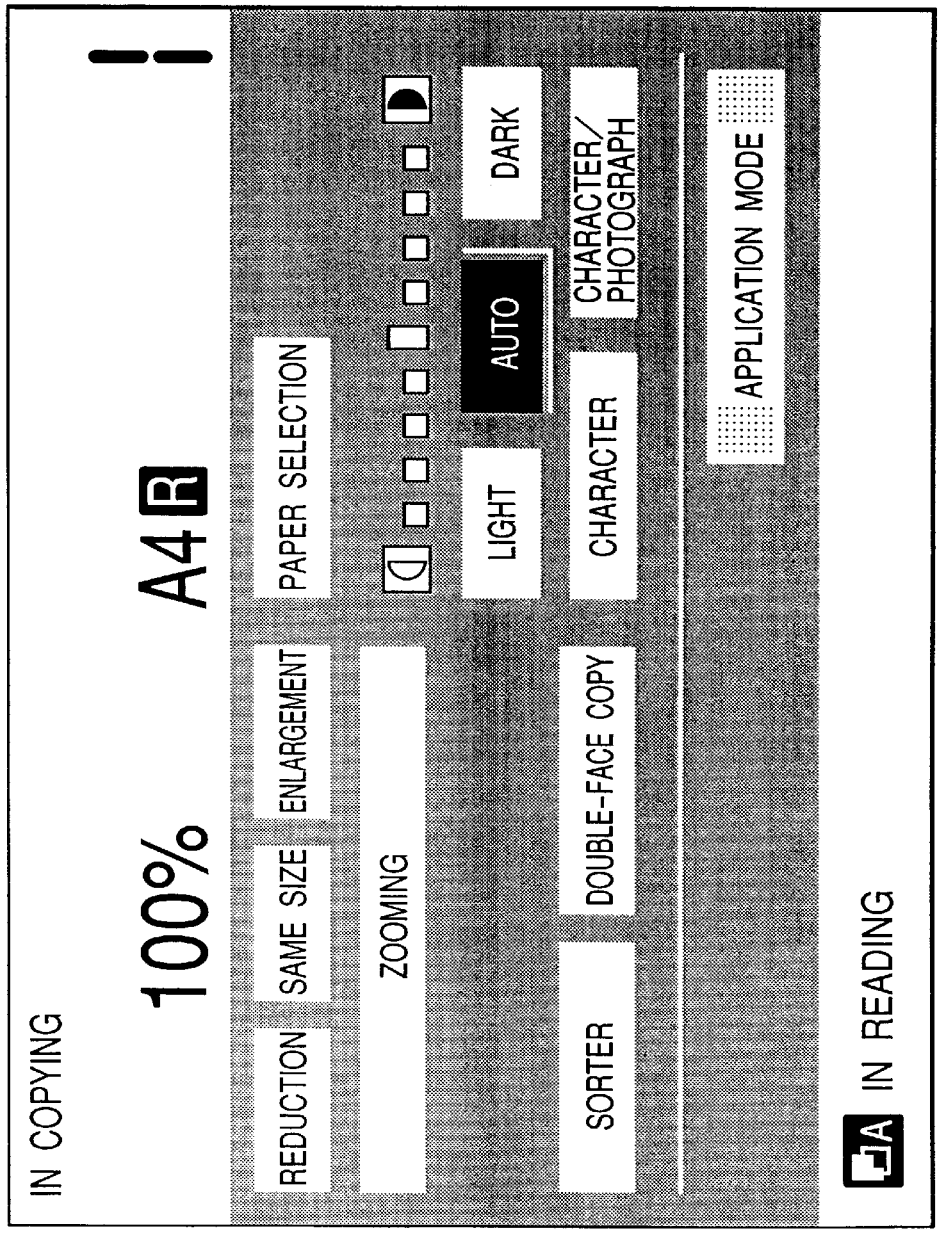
FIG. 33 is a view showing the copy B setting screen at the time of copy A image reading and copy B printing.

Initially, a copy B printing screen indicating that the copy B job is in the printing is displayed as shown in FIG. 32 (901). If next image reading starts in the copy A job, a copy B printing screen is displayed as shown in FIG. 33. Then, the flow advances to a step (902) to judge whether or not the copy B printing terminates. If judged that the printing does not terminate, then it is judged whether or not the printer jam occurs during the copy B printing (903). If judged in the step (903) that the jam occurs, the printer jam is immediately displayed as shown in FIG. 27 (904), and the process waits for release from jam (905). If the jam process terminates and thus the jam is released in the step (905), the print operation is restarted and the copy B printing screen is displayed (906). After the pint standby screen was displayed, the flow returns to the step (902), and then the processes from the steps (902) to (906) are repeated until the copy B printing terminates. Also, if judged in the step (903) that any printer jam does not occur, the flow returns to the step (902).

If judged in the step (902) that the copy B printing terminates, the flow advances to a step (907) to judge whether or not the copy A image reading starts and the DF jam occurs. If judged in the step (907) that the jam occurs, the DF jam is displayed on the screen as shown in FIG. 24 (908), and the process waits for release from jam (909). If the jam process terminates and thus the jam is released in the step (909), the process terminates. Also, if judged in the step (907) that any DF jam does not occur, the process terminates. When the copy B print process terminates, the copy B screen returns to that as shown in FIG. 23.

Thus, a series of operations from the copy B image reading to the copy B printing terminates, and then the state is again shifted to the state I or the standby state (capable of setting next job and starting read operation) for both the copies A and B.

By controlling the operation as above, the copy operation in the copy B job can be effectively performed during execution of the copy A job. Moreover, the jam can be effectively displayed even if the copy A job and the copy B job are in any operation state.

Hereinafter, a structure of a data process program capable of being read by the image formation apparatus according to the present invention will be explained with reference to a memory map of a storage medium (floppy disk, CD-ROM or the like) shown in FIG. 34.

Even in the embodiment, output inquiry order registered in a print output queue may be changed through a display operation on the screen shown in FIG. 9.

FIG. 34 is the view for explaining the memory map of the storage medium which stores various data process programs readable by the image formation apparatus according to the present invention.

Although not specifically illustrated, there is a case where information such as version information, programmer's names or the like used to manage program groups in the storage medium is also stored therein, and also information such as an icon or the like depending on an OS (operating system) or the like provided on a program reading side used to discriminate and display the program is stored therein.

Further, data according to various programs is stored in a directory of the above storage medium. Furthermore, in a case where a program used to install various programs in a computer and programs to be installed in the computer have been compressed, there may be a case where a program or the like used to depress or expand the compressed programs is stored in the storage medium.

The processes shown in FIGS. 10 to 13 and FIGS. 17 to 22 in the above embodiments may be performed by a host computer on the basis of externally installed programs. In this case, the present invention can be applied to even a case where information groups including the programs are supplied to an output device from a storage medium such as a CD-ROM, a flash memory, a FD (floppy disk) or the like or from an external storage medium through a network.

As described above, it can be obviously understood that the objects of the present invention can be achieved also in a case where a storage medium storing program codes of a software to realize the functions of the above embodiments is supplied to a system or an apparatus, and thus a computer (or CPU, MPU) in this system or apparatus reads and executes the program codes stored in the medium.

In this case, the software program codes themselves read from the storage medium realize the new functions of the present invention. Therefore, the storage medium storing these program codes constitutes the present invention.

As the storage medium to store the program codes, e.g., a floppy disk, a hard disk, an optical disk, a magneto-optical disk, a CD-ROM, a CD-R, a magnetic tape, a non-volatile memory card, a ROM, an EEPROM or the like can be used.

Further, it can be obviously understood that the present invention includes not only the case where the functions of the above-described embodiments are realized by executing the program codes read from the computer, but also a case where an OS or the like running on the computer performs a part or all of the actual processes on the basis of instructions of these program codes and thus the functions of the abovedescribed embodiments are realized by such the processes.

Furthermore, it can be obviously understood that the present invention also includes a case where, after the program codes read from the storage medium were written into a function expansion board inserted in the computer or a memory in a function expansion unit connected to the computer, a CPU or the like in the function expansion board or unit performs a part or all of the actual processes on the basis of instructions of these program codes, and the functions of the abovedescribed embodiments are realized based on such the processes.

The present invention is not limited the abovedescribed embodiments, but various modification are possible in the present invention within the scope of the appended claims.

What is claimed is:

1. An image formation apparatus comprising:
   an original feeder for feeding an original to a reading position;
   an image reader for reading an image of the original fed by said original feeder;
   a memory for storing the image read by said image reader;
   a printer for printing the image stored in said memory, on a recording paper;
   display means for displaying a screen concerning a copy job;
   switch instruction means for switching the screen concerning a first copy job and the screen concerning a second copy job, and causing said display means to display the switched screen;
   reservation copy means for causing said switch instruction means to switch the screen to that concerning the second copy job during execution of the first copy job, to enable setting of the second copy job; and
   display control means for causing, in a case where abnormality in the first copy job is detected during the setting of the second copy job by said reservation copy means, said display means to display a selection screen used to select the displaying of the setting screen for setting the second copy job without immediately releasing the abnormality in the first copy job or the displaying concerning the abnormality in the first copy job.

2. An apparatus according to claim 1, wherein the abnormality in the first copy job is recording paper feeding jam in said printer.

3. An apparatus according to claim 1, wherein, when the displaying of the setting screen for setting the second copy job is selected, said display control means causes said display means to perform the displaying concerning the abnormality in the first copy job after the original reading in the second copy job terminates.

4. An image formation apparatus comprising:
   an original feeder for feeding an original to a reading position;
   an image reader for reading an image of the original fed by said original feeder;
   a memory for storing the image read by said image reader;
   a printer for printing the image stored in said memory, on a recording paper;
   display means for displaying a screen concerning a copy job;
   switch instruction means for switching the screen concerning a first copy job and the screen concerning a second copy job, and causing said display means to display the switched screen;
   reservation copy means for causing said switch instruction means to switch the screen to that concerning the second copy job during execution of the first copy job, to enable setting of the second copy job; and
   display control means for switching, in a case where abnormality in the first copy job is detected during the setting of the second copy job by said reservation copy means, the displaying of the setting screen for setting the second copy job to the displaying concerning the abnormality in the first copy job without operating said switch instruction means, and for returning the displaying to that of the setting screen for setting the second copy job after the abnormality is released.

5. An apparatus according to claim 4, wherein the abnormality in the first copy job is recording paper feeding jam in said printer.

6. An image formation apparatus comprising:
   an original feeder for feeding an original to a reading position;
   an image reader for reading an image of the original fed by said original feeder;
   a memory for storing the image read by said image reader;
   a printer for printing the image stored in said memory, on a recording paper;
   display means for displaying a screen concerning a copy job;
   switch instruction means for switching the screen concerning a first copy job and the screen concerning a second copy job, and causing said display means to display the switched screen;
   reservation copy means for causing said switch instruction means to switch the screen to that concerning the second copy job during execution of the first copy job, to enable setting of the second copy job and reading of the original; and
   display control means for preventing, even in a case where abnormality in the first copy job occurs during the reading of the original in the second copy job by said reservation copy means, the switching from the displaying of the screen concerning the second copy job to the displaying concerning the abnormality in the first copy job without operating said switch instruction means until the original reading in the second copy job terminates, and for switching the displaying to that concerning the abnormality in the first copy job after the original reading in the second copy job terminates.

7. An apparatus according to claim 6, wherein the abnormality in the first copy job is recording paper feeding jam in said printer.

8. An apparatus according to claim 6, wherein, when the abnormality is released after the displaying is switched to that concerning the abnormality in the first copy job, said display control means returns the displaying to that of the screen concerning the second copy job.

9. A control method for an image formation apparatus comprising:
   an original feeder for feeding an original to a reading position,
   an image reader for reading an image of the original fed by the original feeder,
   a memory for storing the image read by the image reader,
   a printer for printing the image stored in the memory, on a recording paper,
   display means for displaying a screen concerning a copy job, and
   switch instruction means for switching the screen concerning a first copy job and the screen concerning a second copy job, and causing the display means to display the switched screen, said control method comprising:
   a first job execution step of causing the apparatus to execute the first copy job;
   a reservation step of causing the display means to display the screen concerning the second copy job, to enable setting of the second copy job;
   a detection step of detecting occurrence of abnormality in the first copy job during the setting of the second copy job; and
   a selection display step of causing, when the abnormality is detected in said detection step, the display means to display a selection screen used to select the displaying of the setting screen for setting the second copy job or the displaying concerning the abnormality in the first copy job without immediately releasing the abnormality in the first copy job.

10. A method according to claim 9, wherein said selection display step causes the display means to display the selection screen when the abnormality in the printer is detected in said detection step.

11. A method according to claim 9, further comprising an abnormality display step of causing, when the displaying of the setting screen of the second copy job is selected, the display means to display the abnormality in the first copy job after the image reading in the second copy job terminates.

12. A control method for an image formation apparatus comprising:
   an original feeder for feeding an original to a reading position,
   an image reader for reading an image of the original fed by the original feeder,
   a memory for storing the image read by the image reader,
   a printer for printing the image stored in the memory, on a recording paper,
   display means for displaying a screen concerning a copy job, and
   switch instruction means for switching the screen concerning a first copy job and the screen concerning a second copy job, and causing the display means to display the switched screen, said control method comprising:
   a first job execution step of causing the apparatus to execute the first copy job;
   a reservation step of causing the display means to display the screen concerning the second copy job, to enable setting of the second copy job;
   a detection step of detecting occurrence of abnormality in the first copy job during the setting of the second copy job; and
   a display switch step of switching, when the abnormality is detected in said detection step, the displaying of the screen concerning the second copy job to the displaying concerning the abnormality in the first copy job without operating the switch instruction means, and for returning the displaying to that of the screen concerning the second copy job after the abnormality is released.

13. A method according to claim 12, wherein, in said detection step, original feeding jam in the original feeder is detected.

14. A control method for an image formation apparatus comprising:
   an original feeder for feeding an original to a reading position,
   an image reader for reading an image of the original fed by the original feeder,
   a memory for storing the image read by the image reader,
   a printer for printing the image stored in the memory, on a recording paper,
   display means for displaying a screen concerning a copy job, and
   switch instruction means for switching the screen concerning a first copy job and the screen concerning a second copy job, and causing the display means to display the switched screen, said control method comprising:
   a first job execution step of causing the apparatus to execute the first copy job;
   a reservation step of causing the display means to display the screen concerning the second copy job, to enable setting of the second copy job;
   a detection step of detecting occurrence of abnormality in the first copy job during the setting of the second copy job; and
   a display switch step of preventing, when the abnormality is detected in said detection step, the switching from the displaying of the screen concerning the second copy job to the displaying concerning the abnormality in the first copy job without operating the switch instruction means until the original reading in the second copy job terminates, and for switching the displaying to that concerning the abnormality in the first copy job after the original reading in the second copy job terminates.

15. A method according to claim 14, wherein, in said detection step, recording paper feeding jam in the printer is detected.

16. A method according to claim 14, further comprising a second display switch step of returning the displaying to that of the screen concerning the second copy job when the abnormality is released after the displaying is switched to that concerning the abnormality in the first copy job in said display switch step.

17. An image formation apparatus comprising:
   an image reader for reading an image of an original;
   a memory for storing the image read by said image reader;
   a printer for printing the image stored in said memory, on a recording paper;
   a display for displaying a screen concerning a copy job; and a controller for changing a screen on said display from a screen concerning a first copy job to the screen concerning a second copy job in response to a user instruction for a copy reservation, wherein said controller causes, in a case where abnormality in the first copy job is detected during the setting of the second copy job for the copy reservation, said display to display a screen which the user can indicate that the abnormality is released later, and wherein said controller changes a screen on said display to the screen concerning the second copy job for the copy reservation in response to a user instruction which indicates the abnormality is released later.

18. An apparatus according to claim 17, wherein the abnormality in the first copy is recording paper transporting jam in said printer.

19. An apparatus according to claim 17, wherein said controller causes, in a case where the user indicates the abnormality is released later, said display to perform the displaying concerning the abnormality in the first copy job after the original reading in the second copy job terminates.

20. An image formation apparatus comprising:
an image reader for reading an image of an original;
a memory for storing the image read by said image reader;
a printer for printing the image stored in said memory, on a recording papers;
display for displaying a screen concerning a copy job; and
a controller for changing a screen on said display from a screen concerning a first copy job to the screen concerning a second copy job in response to a user instruction for a copy reservation, wherein said controller causes, in a case where abnormality in the first copy job is detected during the setting of the second copy job for the copy reservation, said display to display a screen concerning the abnormality in the first copy job and changes the screen on said display to the screen concerning the second copy job for the copy reservation after the abnormality is released.

21. An apparatus according to claim 20, wherein the abnormality in the first copy job is recording paper transporting jam in said printer.

22. An image formation apparatus comprising:
an image reader for reading an image of an original;
a memory for storing the image read by said image reader;
a printer for printing the image stored in said memory, on a recording paper;
a display for displaying a screen concerning a copy job; and
a controller for changing a screen on said display from a screen concerning a first copy job to the screen concerning a second copy job in response to a user instruction for a copy reservation, wherein said controller prevents, in a case where abnormality in the first copy job occurs during the reading of the original in the second copy job, from changing the screen on said display from the screen concerning the second copy job to the screen concerning the abnormality in the first copy job until the original reading in the second copy job terminates and changes the screen on said display to the screen concerning the abnormality in the first copy job after the original reading in the second copy job terminates.

23. An apparatus according to claim 22, wherein the abnormality in the first copy job is recording paper transporting jam in said printer.

24. An apparatus according to claim 22, wherein, when the abnormality is released after the screen is changed to the screen concerning the abnormality in the first copy job, said controller changes the screen on said display to the screen concerning the second copy job.

25. An image formation method comprising the steps of:
an image reading step for reading an image of an original;
a memory step for storing the image read by said image reading step;
a printing step for printing the image stored in said memory step, on a recording paper;
a display step for displaying a screen concerning a copy job; and
a controlling step for changing a screen on said display from a screen concerning a first copy job to the screen concerning a second copy job in response to a user instruction for a copy reservation, wherein said controlling step causes, in a case where abnormality in the first copy job is detected during the setting of the second copy job for the copy reservation, said display step to display a screen which the user can indicate that the abnormality is released later, and wherein said controlling step changes a screen on said display step to the screen concerning the second copy job for the copy reservation in response to a user instruction which indicates the abnormality is released later.

26. A method according to claim 25, wherein the abnormality in the first copy is recording paper transporting jam in said printing step.

27. An apparatus according to claim 25, wherein said controlling step causes, in a case where the user indicates the abnormality is released later, said display step to perform the displaying concerning the abnormality in the first copy job after the original reading in the second copy job terminates.

28. An image formation method comprising the steps of:
an image reading step for reading an image of an original;
a memory step for storing the image read by said image reading step;
a printing step for printing the image stored in said memory step, on a recording papers;
a display step for displaying a screen concerning a copy job; and
a controlling step for changing a screen on said display step from a screen concerning a first copy job to the screen concerning a second copy job in response to a user instruction for a copy reservation, wherein said controlling step causes, in a case where abnormality in the first copy job is detected during the setting of the second copy job for the copy reservation, said display step to display a screen concerning the abnormality in the first copy job and changes the screen on said display step to the screen concerning the second copy job for the copy reservation after the abnormality is released.

29. A method according to claim 28, wherein the abnormality in the first copy job is recording paper transporting jam in said printing step.

30. An image formation method comprising the steps of:
an image reading step for reading an image of an original;
a memory step for storing the image read by said image reading step;
a printing step for printing the image stored in said memory step, on a recording paper;

a display step for displaying a screen concerning a copy job; and a controlling step for changing a screen on said display step from a screen concerning a first copy job to the screen concerning a second copy job in response to a user instruction for a copy reservation, wherein said controlling step prevents, in a case where abnormality in the first copy job occurs during the reading of the original in the second copy job, from changing the screen on said display step from the screen concerning the second copy job to the screen concerning the abnormality in the first copy job until the original reading in the second copy job terminates and changes the screen on said display step to the screen concerning the abnormality in the first copy job after the original reading in the second copy job terminates.

31. A method according to claim 30, wherein the abnormality in the first copy job is recording paper transporting jam in said printing step.

32. A method according to claim 22, wherein, when the abnormality is released after the screen is changed to the screen concerning the abnormality in the first copy job, said controlling step changes the screen on said display step to the screen concerning the second copy job.

* * * * *

UNITED STATES PATENT AND TRADEMARK OFFICE
CERTIFICATE OF CORRECTION

PATENT NO.    : 6,433,880 B1
DATED         : August 13, 2002
INVENTOR(S)   : Akinobu Nishikata et al.

It is certified that error appears in the above-identified patent and that said Letters Patent is hereby corrected as shown below:

Column 1,
Line 16, "obta ined" should read -- obtained --.

Column 6,
Line 60, "laterdescribed" should read -- later-described --.

Column 9,
Line 58, "fu nction" should read -- function --.

Column 10,
Line 21, "laterdescribed" should read -- later-described --.

Column 12,
Line 35, "Jobs" should read -- jobs --.

Column 15,
Line 11, "Judged" should read -- judged --.

Column 17,
Line 43, "be." should read -- be --.

Column 21,
Line 28, ""i."" should read -- "1". --.

Column 24,
Line 15, "be." should read -- be --.

UNITED STATES PATENT AND TRADEMARK OFFICE
CERTIFICATE OF CORRECTION

PATENT NO. : 6,433,880 B1
DATED : August 13, 2002
INVENTOR(S) : Akinobu Nishikata et al.

It is certified that error appears in the above-identified patent and that said Letters Patent is hereby corrected as shown below:

Column 25,
Line 39, "pint" should read -- print --.

Column 27,
Line 29, "abovedescribed" should read -- above-described --; and
Line 31, "abovedescribed" should read -- above-described --.

Signed and Sealed this

Eighteenth Day of February, 2003

JAMES E. ROGAN
*Director of the United States Patent and Trademark Office*